United States Patent
Sato et al.

(10) Patent No.: US 11,203,685 B2
(45) Date of Patent: Dec. 21, 2021

(54) ACRYLIC MATTE RESIN FILM

(71) Applicant: Mitsubishi Chemical Corporation, Tokyo (JP)

(72) Inventors: Yoshiaki Sato, Tokyo (JP); Mizuki Anabuki, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/127,854

(22) Filed: Dec. 18, 2020

(65) Prior Publication Data

US 2021/0115240 A1    Apr. 22, 2021

Related U.S. Application Data

(63) Continuation of application No. PCT/JP2019/023660, filed on Jun. 14, 2019.

(30) Foreign Application Priority Data

Jun. 21, 2018 (JP) .............................. JP2018-117901

(51) Int. Cl.
*B32B 27/08* (2006.01)
*C08L 33/08* (2006.01)
*B32B 27/30* (2006.01)

(52) U.S. Cl.
CPC .............. *C08L 33/08* (2013.01); *B32B 27/08* (2013.01); *B32B 27/308* (2013.01);
(Continued)

(58) Field of Classification Search
CPC ..... B32B 15/08; B32B 15/082; B32B 15/085; B32B 15/088; B32B 15/09; B32B 15/18;
(Continued)

(56) References Cited

FOREIGN PATENT DOCUMENTS

| JP | 2002-361712 A | 12/2002 |
|---|---|---|
| JP | 2003-049042 A | 2/2003 |

(Continued)

OTHER PUBLICATIONS

International Search Report issued in related International Patent Application No. PCT/JP2019/023660 dated Sep. 10, 2019.
(Continued)

*Primary Examiner* — Lawrence D Ferguson
(74) *Attorney, Agent, or Firm* — Morgan, Lewis & Bockius LLP

(57) ABSTRACT

The present invention is to provide an acrylic matte resin film with good matte appearance, high thermal stability during molding, stable production, in addition, excellent appearance design, high mechanical strength, easy handling, and applicability for various applications.

Provided is an acrylic matte resin film which has a surface having a 60° surface glossiness (Gs60°) of less than 100% on at least one of the films, wherein an arithmetic mean roughness (Ra) of the surface having the surface glossiness satisfies the following formula (1) and wherein the surface satisfying the following formula (1), comprises an acrylic resin composition (a) has a gel content of 40% by mass or more:

$$2.2 \times NGs60°^{(-0.97)} \leq Ra \leq 4.4 \times NGs60°^{(-0.97)} \ldots 式 \quad (1)$$

wherein NGs indicates a value obtained by excluding % from Gs60°, which is less than 100%.

13 Claims, 2 Drawing Sheets

(52) U.S. Cl.
CPC ... *B32B 2307/406* (2013.01); *B32B 2307/408* (2013.01); *B32B 2307/412* (2013.01); *B32B 2307/538* (2013.01); *C08L 2205/03* (2013.01)

(58) Field of Classification Search
CPC ......... B32B 15/20; B32B 21/02; B32B 21/08; B32B 2255/10; B32B 2255/205; B32B 2262/101; B32B 2264/0214; B32B 2264/0235; B32B 2264/025; B32B 2264/102; B32B 2264/104; B32B 2270/00; B32B 2274/00; B32B 2307/21; B32B 2307/212; B32B 2307/306; B32B 2307/308; B32B 2307/406; B32B 2307/408; B32B 2307/412; B32B 2307/536; B32B 2307/538; B32B 2307/546; B32B 2307/558; B32B 2307/584; B32B 2307/712; B32B 2307/714; B32B 2307/7145; B32B 2307/7265; B32B 2307/732; B32B 2307/75; B32B 2605/00; B32B 27/08; B32B 27/16; B32B 27/18; B32B 27/20; B32B 27/22; B32B 27/28; B32B 27/281; B32B 27/285; B32B 27/286; B32B 27/302; B32B 27/304; B32B 27/306; B32B 27/308; B32B 27/32; B32B 27/34; B32B 27/36; B32B 27/365; B32B 27/38; B32B 27/40; B32B 7/12; C08J 2333/10; C08J 5/18; C08L 2205/03; C08L 33/06; C08L 33/08
See application file for complete search history.

(56) References Cited

FOREIGN PATENT DOCUMENTS

| | | |
|---|---|---|
| JP | 2003-342389 A | 12/2003 |
| JP | 2006-342358 A | 12/2006 |
| JP | 2008-297485 A | 12/2008 |
| JP | 2009-155504 A | 7/2009 |
| JP | 2009-175387 A | 8/2009 |
| JP | 2009-255555 A | 11/2009 |
| JP | 2012-144714 A | 8/2012 |
| JP | 2015-086339 A | 5/2015 |

OTHER PUBLICATIONS

Extended European Search Report issued in corresponding European Patent Application No. 19823581.4 dated Jun. 18, 2021.

[Fig.1]
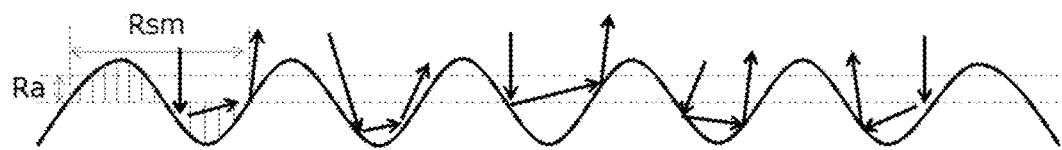
[Fig. 2]
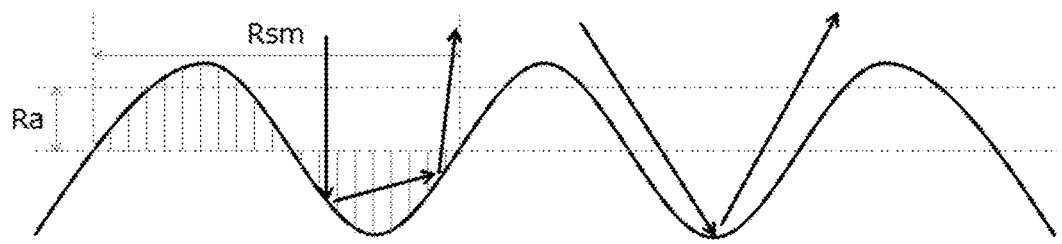

[Fig 3]
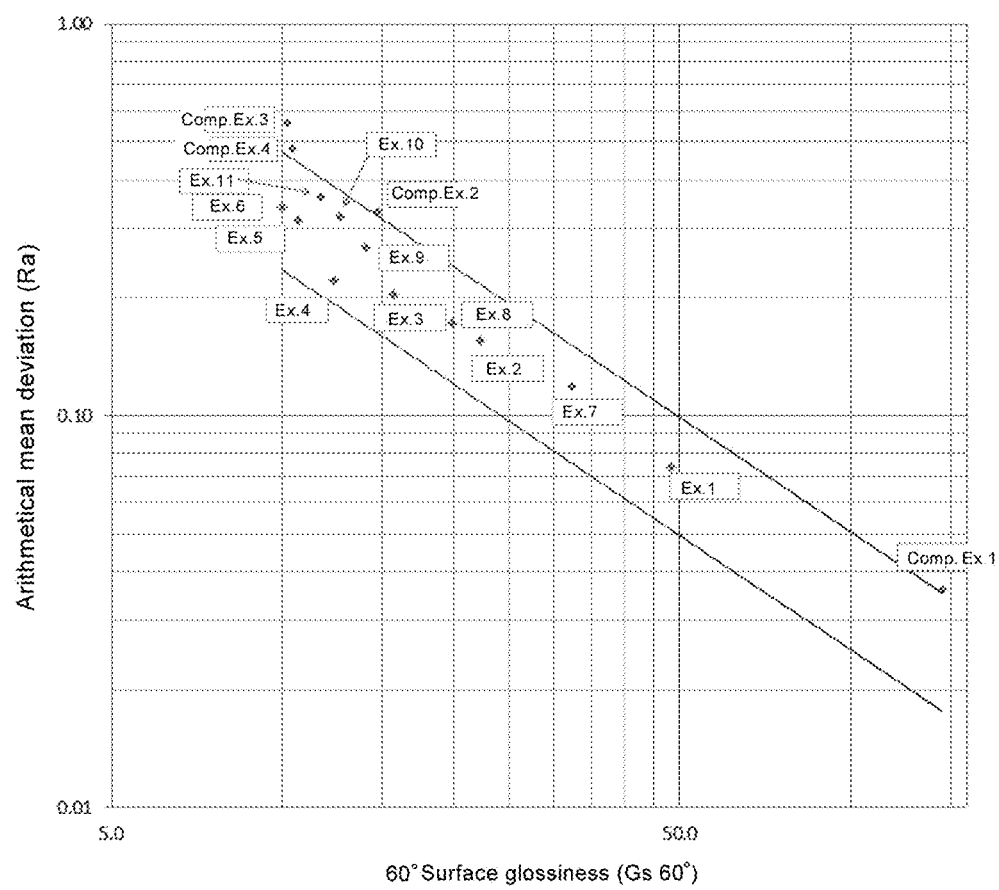

ACRYLIC MATTE RESIN FILM

TECHNICAL FIELD

The present invention relates to an acrylic matte resin film comprising an acrylic resin composition capable of exhibiting matting property.

BACKGROUND TECHNIQUES

Molded bodies made of acrylic resin are widely used for such applications as electrical parts, vehicle parts, optical parts, ornaments, signboards, etc. because of their excellent transparency, beautiful appearance and weather resistance. In particular, acrylic resin molded bodies made of acrylic resin compositions including rubber-containing polymer are widely used.

Such rubber-containing polymers are produced, for example, by emulsion polymerization method or the like.

In other words, polybutadiene latex, styrene-butadiene copolymer latex, acrylonitrile-butadiene-styrene copolymer latex, rubber-containing acrylic graft copolymer latex, or the like is produced by an emulsion polymerization method or the like, and a powdery polymer is separated and recovered by subjecting these latexes to a treatment such as salting out, acid precipitation coagulation, spray drying, or lyophilization.

This powdery polymer is usually obtained by adding an appropriate compounding agent in a compound step, melt-kneading it in a single screw extruder, a double screw extruder, or the like, extruding it as a strand, and cutting it by a cold cut method, a hot cut method, or the like, and pelletizing it.

Then, this pellet is supplied to a T-die extruder or molder and processed into an acrylic resin molded body.

Film acrylic resin molded bodies (hereafter referred to as acrylic resin films) are laminated on the surface of various resin articles, woodwork products, and metal articles, taking advantage of their superior transparency, weather tolerance, flexibility, and processing properties.

As a method of modifying the surface of a resin article, a transcription method in which a film modified by printing, etc. is inserted into an injection mold, and after injection molding, only the decorated layer is transcribed to the molded body surface, and then the film is stripped, instead of painting; an insert molding method in which a modified film is left in a molded body as the most surface of a resin article; an in-mold molding method for modifying at the same time as injection molding; and a method in which the film is laminated on the injection molded body surface, etc. are widely used.

Although acrylic resin films are used as these modified films, the presence of 100 μm or more of contaminants in the films has become a problem when they are used as protective films for internal and external wear materials such as cars, optical materials, construction materials, PC materials, and household electricalized products. This resulted in a marked limitation in the use of the above modified films.

Recently, it has been required to add designability and decorativeness such as high-quality and deep sensation with the surface of printed acrylic resin films as a matting condition.

Such a demand can be realized by subjecting an acrylic matte resin film to printing (see Patent Documents 1 and 2)

When a polymer containing hydroxyl groups described in Patent Documents 1 and 2 is used as a matting agent, an acrylic matte resin film having a better matte appearance compared with an organic crosslinked particle or an inorganic particle which is generally used as a matting agent is obtained.

However, when the inventor tried to follow the acrylic matting resin film described in each example of these Patent Documents 1 and 2, the inventor determined that there was a glare in the matte appearance and that there was still room for improvement in terms of satisfying customer requirements.

In addition, when the polymer containing hydroxyl groups was used as a matting agent, the resulting molded article was film, which was prone to failure such as an increase over time in a defect called fish eye caused by heat deterioration, and it was difficult to perform melt extrusion such as film molding over a long period of time.

PRIOR-ART DOCUMENT

Patent Document

Patent Document 1: JP2003-342389
Patent Document 2: JP2009-255555

SUMMARY OF THE INVENTION

Problems to be Solved by the Present Invention

Therefore, the purpose of the present invention is to provide an acrylic matte resin film with good matte appearance, high thermal stability during molding, stable production, in addition, excellent appearance design, high mechanical strength, easy handling, and applicability for various applications.

Means for Solving the Problems

It has been found that the above problems are solved by the following means [1] to [6]. The present invention provides the following means [1] to [6].

[1] An acrylic matte resin film which has a surface having a 60° surface glossiness (Gs60°) of less than 100% on at least one of the films, wherein an arithmetic mean roughness (Ra) of the surface having the surface glossiness satisfies the following formula (1) and wherein the surface satisfying the following formula (1), comprises an acrylic resin composition (a) has a gel content of 40% by mass or more:

$$2.2 \times NGs60^{\circ(-0.97)} \leq Ra \leq 4.4 \times NGs60^{\circ(+0.97)} \quad \text{Formula (1)}$$

wherein NGs indicates a value obtained by excluding % from Gs60°, which is less than 100%.

[2] An acrylic matte resin film which has a surface having a 60° surface glossiness (Gs60°) of less than 100% on at least one of the films, wherein an arithmetic mean roughness (Ra) of the surface having the surface glossiness is 0.05 or more and 0.47 or less, and a mean length of contour curve elements (Rsm) is 30.00 or more and 80.00 or less, and wherein the surface having the surface glossiness comprises an acrylic resin composition (a) has a gel content of 40% by mass or more:

[3] An acrylic matte resin film having a laminated structure of a matte acrylic resin layer comprising the acrylic matte resin film described in [2] or [3] and a transparent acrylic resin layer.

[4] The acrylic matte resin film of any of [1] to [3] wherein the acrylic resin composition (a) has a MFR retention rate (M2/M1) of 0.7 to 1.3, which is a ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

[5] The acrylic matte resin film described in [4], wherein the acrylic resin composition (a) contains an acrylic rubber-containing polymer (a-1), a polymer containing a hydroxyl group (a-2), and a phosphorus-based antioxidant having an alkyl group having 8 or more carbon atoms (a-3).

[6] The acrylic matte resin film described in [5], wherein the phosphorus-based antioxidant (a-3) is at least one selected from the group of compounds represented by the following general formula (2), and the content of the phosphorus-based antioxidant (a-3) in the acrylic resin composition (a) is 0.45 to 2.00% by mass:

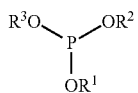

Formula (2)

wherein $R^1$, $R^2$ and $R^3$ each independently represents an alkyl group having 8 to 18 carbon atoms.

Effect of Invention

According to the present invention, an acrylic matte resin film with good matte appearance, high thermal stability during molding, stable production, in addition, excellent appearance design, high mechanical strength, easy handling, and applicability for various applications can be provided.

BRIEF DESCRIPTION OF THE DRAWINGS

FIG. 1 is a conceptual diagram showing the scattering frequency of incident light and the state of scattering on the surface of the acrylic matting resin film of the present invention. Incident light has a high scattering frequency.

FIG. 2 is a conceptual diagram showing the scattering frequency of incident light and the state of scattering on the surface of an acrylic matting resin film shown in a Comparative Example. Incident light may not scatter and may reflect, and the scattering frequency is low.

FIG. 3 shows the relationship between Equation (1), Examples, and Comparative Examples.

DETAILED DESCRIPTION OF THE PRESENT INVENTION

Hereinafter, aspects of the present invention will be described in detail, but the scope of the present invention is not limited to these descriptions, and other than the following illustrations, the present invention can be appropriately modified and implemented without impairing the purpose of the present invention.

<Acrylic Matte Resin Film>

The acrylic matte resin film according to the present invention comprises an acrylic resin, and has a 60° surface glossiness (Gs60°) of at least one surface of less than 100%.

In the present invention, a surface having a Gs60° of less than 100% is referred to as a "surface having matte property".

And, a surface having a Gs60° of over 100% is referred to as a "surface not having matte property".

In the case of a single layer film it is an acrylic matte resin film which becomes a single layer structure of a matte acrylic resin layer made of a matte acrylic resin film comprising a surface having at least one surface having a matte property.

In addition, in the case of a multilayer film, it is an acrylic matte resin film in which a transparent acrylic resin layer which becomes a surface in which a non-laminated surface does not have matte property is laminated on a matte acrylic resin layer made of a matte acrylic resin film in which non-laminated surface has a matte property.

The surface having matte property can be formed using an acrylic resin composition capable of exhibiting matte property (a) described later.

The transparent acrylic resin layer can be formed using an acrylic resin composition which does not exhibit matte property (b) described later.

In the acrylic matte resin film according to the present invention, in relation to arithmetic mean roughness (Ra) with numerical NGs excluding % from the 60° surface glossiness (Gs60°) of the surface having matte property, Ra is not less than $2.2 \times NGs60°^{(-0.97)}$ and not more than $4.4 \times NGs60°^{(-0.97)}$. Ra is $2.3 \times NGs60°^{(-0.97)}$ or more and $4.1 \times NGs60°^{(-0.97)}$ or less is preferred, and $2.4 \times NGs60°^{(-0.97)}$ or more that $3.8 \times NGs60°^{(-0.97)}$ or less is preferred.

If Ra is $2.2 \times NGs60°^{(-0.97)}$ or more, it is preferable because the values of Ra and mean length of contour curve elements (Rsm) [μm] are not too small, the scattering frequency is not too low, in addition, since the incident light is not scattered and there is nothing to reflect, the intensity of the reflected light does not become too high, the glare of the matte appearance is reduced, and the designability and decorativeness such as luxury and depth are excellent.

If Ra is $4.4 \times NGs60°$ (−0.97) or less, it is preferable because the values of Ra and mean length of contour curve elements (Rsm) [μm] are not too large, scattering frequency is not too low, since the incident light is not scattered and there is nothing to reflect, the intensity of the reflected light does not become too high, matte texture is finer, appearance glare is extremely low, and designability and decorativeness such as a luxurious feel and a deep feel are excellent.

In the present invention, there is no particular limitation on the method of placing Ra $2.2 \times NGs60°^{(-0.97)}$ or more and $4.4 \times NGs60°$ (−0.97) or less, but there is a method of using a resin composition capable of expressing matte property in terms of optimal arithmetic mean roughness (Ra) for 60° surface glossiness (Gs60°) and a method of imparting a matte shape by post-processing after forming a film.

Incidentally, 60° surface glossiness (Gs60°) is a value measured according to JIS Z8741, arithmetic mean roughness (Ra) is a value measured according to JIS B0601-2001, in particular is as described in the Examples.

Gs60° is less than 100%. On the other hand, the lower limit of Gs60° is preferably 1%. Gs60° is preferably 5% or more and less than 70%, more preferably 6% or more and less than 32%, and particularly preferably 7% or more and less than 20%

When Gs60° of the surface having matte property is 1% or more and less than 100%, the obtained acrylic matte resin film has matte property, and designability and decorativeness such as a luxurious feel and a deep feel are excellent.

And, when Gs60° is less than 70%, it is less affected by the processing condition and the fabrication condition, and it is excellent in the stabilization of the matte appearance.

On the other hand, when Gs60° is 5% or more, it is not necessary to add a large amount of a matting agent, and a film appearance defect such as fish eye is reduced.

In addition, it is preferred from an economic point of view.

In the acrylic matte resin film according to the present invention, in relation to arithmetic mean roughness (Ra) with mean length of contour curve elements (Rsm) [μm], when Ra is 0.05 or more and 0.47 or less, and Rsm is 30.00 or more and 80.00 or less, it is preferable because scattering of incident light is moderate, incident light is not reflected as it is, matte texture is finer, appearance glare low, and designability and decorativeness such as a luxurious feel and a deep feel are excellent.

When Ra is 0.14 or more and 0.45 or less, and Rsm is 43.00 or more and 78.00 or less, it is more preferable because Gs60° is less than 32%.

When Ra is 0.18 or more and 0.43 or less, and Rsm is 46.00 or more and 76.00 or less, it is particularly preferred because Gs60° is less than 20%.

The mean length of contour curve elements (Rsm) is measured according to JIS B0601-2001 and is described in detail in the Examples.

In addition, 600 surface glossiness (Gs60°) of the surface not having matte property is 100% or more. It is preferably 120% or more, more preferably 140% or more.

If 60° surface glossiness (Gs60°) of the surface not having matte property is 100% or more, printing suitability and lamination suitability will be improved.

That is, in the case of a multilayered film, the non-laminated area of the transparent acrylic resin layer is superior in smoothness, so it can extremely reduce loss of printing.

Further, when the acrylic matte resin film after printing is applied is laminated on a base material, since a surface excellent in smoothness of the transparent acrylic resin layer can be laminated so as to be in contact with the base material, laminate suitability is excellent.

The ratio of the layer thickness of the acrylic matte resin layer and the transparent acrylic resin layer formed of the matte acrylic resin film is not particularly limited. From the viewpoint of transparency, matte appearance and printability of the acrylic matte resin film, 1/99 to 99/1 is preferred, and 50/50 to 10/90 is more preferred.

The acrylic matte resin film can be produced by known methods such as melting distraction method, T die method, inflation method, etc., and the T die method is preferred from the viewpoint of economical efficiency.

In addition, in the case of a multilayer film, by a T-die multilayer method or the like, it is possible to obtain an acrylic matte resin film which is laminated by co-extruding a matte acrylic resin layer made of a matte acrylic resin film using an acrylic resin composition (a) described later, and a transparent acrylic resin layer using an acrylic resin composition (b) described later.

When a film is molded by the T-die method, a method that is made by narrowing to multiple rolls or belts selected from metallic rolls, non-metallic rolls and metallic belts can improve the surface smoothness of the resulting film and inhibit the loss of printing when it is printed on the film.

The metal rolls may be exemplified by metallic mirror touchrolls JP2808251 or rolls used in a sleeve-touch manner comprising metallic sleeves (metallic thin-film pipes) and molding rolls described in WO97/28950.

Also, as the non-metallic rolls, touch rolls such as silicone rubber may be exemplified.

Further, as the metal belts, metal endless belts or the like can be exemplified. Multiple combinations of these metal rolls, non-metal rolls and metal belts may be used.

In the procedure described above, in which membranes are made by narrowing to multiple rolls or belts selected from metallic rolls, non-metallic rolls and metallic belts, it is preferable to that the acrylic resin composition (a) which can express tmatting property after melt extrusion, is narrowed in a condition in which there is substantially no bank (resin reservoir) and is surface-transferred without being substantially rolled to form a film.

If the film is made without forming a bank (resin reservoir), the heat contraction rate of the film made by this method can also be reduced, because the acrylic resin composition (a) which can express matting property in the cooling process is surface transferred without being rolled down.

In addition, when melt extrusion is performed by a T-die method or the like, a screen for removing foreign matters or the like mixed in an extruded raw material is installed in a zone in front of a T-die portion of an extruder, and it is also possible to remove foreign matters from an acrylic resin composition (a) capable of exhibiting matting property.

Examples of such screens include filter packs, screen changers, leaf disc types and pleated types of polymer filters using gold meshes, sintered metal nonwoven fabrics, etc.

The thickness of the acrylic matte resin film is preferably 300 μm or less.

When used in laminated articles, it is preferred to be 50 μm to 300 μm thick.

This thickness of 50 μm or more is preferred because it provides adequate depth in the appearance of the article.

Also, sufficient thickness can be obtained by distraction, especially when molding into complex shapes.

On the other hand, if the thickness is 300 μm or less, the lamination and secondary processing properties tend to be improved, which is desirable because it has a moderate degree of stiffness.

It is also economically advantageous in terms of mass per unit area.

Further, film formability is stabilized to facilitate production of the film.

The total light transmittance of the acrylic matte resin film is preferably 90% or more.

If the total light transmittance is 90% or more, the design is superior when acrylic matted resin films are laminated directly or on resin sheets and then on the surface of various resin articles, woodworker products, or metal articles in three-dimensional shape.

The acrylic matte resin film can be subjected to surface treatment for imparting various functions, if necessary.

Examples of the surface treatment include printing treatment such as silk printing, ink jet printing; metal deposition treatment sputtering, wet plating treatment forgiving metallic tone or preventing reflection; surface hardening treatment for improving surface hardness; water repellent treatment or photocatalytic layer forming treatment for preventing fouling; or antistatic treatment for the purpose of dust adhesion prevention or electromagnetic wave cutting; antireflective layer forming, anti-glare treatment, and the like.

Among the above-described processes, when a printing process is performed, it is preferable to perform a single-side printing process on a film, and among them, a back printing process in which a printing surface is disposed on an adhesive surface with a base resin is particularly preferred from the viewpoint of protecting a printing surface and imparting a high-grade feeling.

<Acrylic Resin Composition (a) Capable of Exhibiting Matte Property>

An acrylic resin composition (a) capable of exhibiting matte property, which is used for producing an acrylic matte resin film according to the present invention, is a resin composition constituting an acrylic matte resin film in the case of a single layer film.

In addition, in the case of a multilayer film, it is a resin composition constituting a matte acrylic resin layer made of a matte acrylic resin film.

The acrylic resin composition (a) capable of exhibiting matting property is not particularly limited, and any composition may be used as long as it exhibits matte property when formed into a film and contains an acrylic resin as a main component.

Examples of the method of expressing matte property include blending of an organic crosslinked particle, an inorganic particle, and a resin composition having low compatibility with an acrylic resin composition.

Examples of the organic crosslinked particle include particles such as a styrene-based resin crosslinked particle, an acrylic resin crosslinked particle, a fluorine-based resin crosslinked particle, and a silicone-based resin crosslinked particle.

Examples of the inorganic particle include particles such as silica, alumina, calcium carbonate, titanium Oxide, mica, mica, and talc.

Examples of the resin composition having low compatibility with the acrylic resin composition include a polymer (a-2) containing a hydroxyl group.

Among the methods of expressing matte property, a polymer (a-2) containing a hydroxyl group described later can be suitably used from the viewpoint of extremely low feeling of glare appearance of the obtained acrylic matte resin film and excellent designability and decorativeness such as a luxurious feel and a deep feel are excellent.

The gel content ratio of the acrylic resin composition (a) is 40% by mass or more.

The gel content ratio is more preferably 40% by mass or more and 80% by mass or less, still more preferably 42% by mass or more and 70% by mass or less, and still more preferably 45% by mass or more and 60% by mass or less.

When the gel content ratio of the acrylic resin composition (a) is 40% by mass or more, the mechanical strength of the obtained molded body is high and handling is easy.

Especially when the molded body is a film, the design is superior when acrylic matted resin films are laminated directly or on resin sheets and then on the surface of various resin articles, woodworker products, or metal articles in three-dimensional shape.

When the gel content ratio of the acrylic resin composition (a) is 80% by mass or less, fluidity and thermal stability at the time of molding do not become too low, and melt viscosity can be suppressed lower, and the residence in the molding machine can be reduced and thermal deterioration of resins can be suppressed, which is preferable.

When the resulting molded body is a film, failure such as an increase over time of the defect called fish eye caused by heat degradation is less likely to occur, and it is possible to perform melt extrusion such as film molding for a relatively long period of time Here, the gel content ratio of the acrylic resin composition (a) can be calculated by the following formula.

$$G = (m/M) \times 100$$

In the formula, G (%) represents a gel content ratio of the acrylic resin composition (a), M represents a mass of an acrylic resin composition (a) of a predetermined amount (also referred to as a pre-extraction mass), and m represents a mass of an acetone insoluble portion of the acrylic resin composition (a) of the predetermined amount (also referred to as a post-extraction mass)

More particularly, m is obtained by dissolving an acrylic resin composition (a) in acetone at a concentration of 1 g/100 mL, refluxing at 65° C. for 4 hours; performing centrifugation, refluxing, centrifugation, and decantation again for the remaining solid, and drying the obtained solid at 50° C. for 24 hours.

The MFR-retention ratio (M2/M1) of acrylic resin composition (a) is calculated from the ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

The MFR-retention ratio (M2/M1) is preferably in the range of 0.7 to 1.3, more preferably in the range of 0.85 to 1.15, and still more preferably in the range of 0.9 to 1.1 If the MFR-retention ratio (M2/M1) is 0.7 or more, thermostability during molding is higher, and the increase in melting viscosity due to thermal deterioration of resin can be kept lower, and retention in the molding machine can be less, and thermal deterioration of resin can be suppressed.

When the resulting molded body is a film, failure such as an increase in a defect called a fish eye caused by heat degradation over time is not likely to occur, and it is possible to perform melt extrusion such as film molding over a long period of time.

When the MFR retention ratio (M2/M1) is 1.3 or less, thermal stability at the time of molding can be further increased and thermal decomposition of the resin can be suppressed lower, and thermal deterioration of the resin due to side reactions can be suppressed, which is preferable.

When the resulting molded body is a film, failure such as an increase in a defect called a fish eye caused by heat degradation over time is not likely to occur, and it is possible to perform melt extrusion such as film molding over a long period of time.

The acrylic resin composition (a) can be produced by known methods such as uniaxial kneading method using extruder which is a general compound fabrication, coaxial biaxial kneading method, aberrant biaxial kneading method, etc., but the method with high kneading effect such as biaxial kneading method is preferred.

Preferred biaxial extruders include TEM series made by Toshiba Machine Co., Ltd.

Also, the screw configuration includes a screw configuration with a kneading part to refine the acrylic resin composition (a), such as a transport section carrying an acrylic resin composition (a) and a screw segments with opposite needling zones and melt feeding direction (screw segment with opposite turning of the spiral).

Further, it is preferable that the extruder has a vent capable of degassing the moisture in the acrylic resin composition (a) as a raw material and the volatile gas generated from the melt melted and kneaded.

Decompressive pumps, such as vacuum pumps, are preferred for venting.

The generated moisture and volatile gas are efficiently discharged from the extruder outside by the placement.

It is also possible to install a screen for removing foreign matters or the like mixed in the extrusion raw material in a zone in front of a die portion of the extruder, and to remove the foreign matters from the acrylic resin composition (a).

Examples of such screens include filter packs, screen changers, leaf disc types and pleated types of polymer filters using gold meshes, sintered metal nonwoven fabrics, etc.

Further, as a method of increasing the kneading effect, there may be mentioned a method in which the number of revolutions of the screw is increased as much as possible and the amount of the acrylic resin composition (a) to be supplied is reduced, and thus the acrylic resin composition (a) melt-extruded tends to be easily sheared and heated, and the temperature at the head portion tends to be increased.

Melt melt-kneaded in the extrude is extruded as a strand from a die with a nozzle 3-5 mm in diameter placed in the head region, cut with cold-cut or hot-cut techniques, and pelleted.

It is preferable that the acrylic resin composition (a) contains an acrylic rubber-containing polymer (a-1), a polymer containing a hydroxyl group (a-2), and a phosphorus-based antioxidant (a-3) having an alkyl group having 8 or more carbon atoms.

<Acrylic Rubber-Containing Polymer (a-1)>

Molecularly structurally, a crosslinked rubber having a crosslinking point in the molecular and having a 3 dimensional network structure or a polymer containing a vulcanized rubber is referred to herein as a "rubber-containing polymer"

As used herein, the term "rubber" is defined as a polymer corresponding to an acetone insoluble content of the acrylic rubber-containing polymer (a-1)

It is preferable that the acrylic resin composition (a) according to the present invention contains the acrylic rubber-containing polymer (a-1) The acrylic rubber-containing polymer (a-1) is not particularly limited, and any rubber-containing polymer may be used as long as the main component is an acrylic polymer.

However, the acrylic rubber-containing polymer (a-1) is preferably one which gives thermoplasticity to the acrylic resin composition (a) according to the present invention, and more preferably a rubber-containing polymer having thermoplasticity.

As the acrylic rubber-containing polymer (a-1) in the present invention, a rubber-containing acrylic based graft copolymer contained in various acrylic resin compositions conventionally known is preferred.

In particular, when flexibility is required in a building material application or the like, rubber-containing acrylic basic graft copolymers described in JP-A-62-19309 (particularly, a multilayer structure polymer described in claim 1), JP-A-63-8983 (particularly, a multilayer structural polymer [I] described in claim 1), or the like are preferred.

In addition, in particular, when scratch resistance, pencil hardness, heat resistance and chemical resistance are necessary for vehicle applications, rubber-containing acrylic basic graft copolymers described in JP 8-323934 (in particular, a rubber-containing copolymer (II) described in claim 1), JP 11-147237 (in particular, a three-layered acrylic basic polymer described in claim 1), JP 2002-80678 (in particular, a rubber-containing copolymer (II) described in claim 1), JP 2002-80679 (in particular, the rubber-containing polymer (II) described in claim 1), JP 2005-97351 (in particular, a multilayer structural polymer (II) described in claim 2) or the like are preferred.

Further, in particular, when molding whitening resistance in the case of performing insert molding or in-mold molding is required, rubber-containing acrylic basic graft copolymers described in JP 2004-137298 (in particular, (A) acrylic acid ester based graft copolymer containing acrylic acid ester-based rubber-like polymer described in claim 1), JP 2005-163003 (in particular a multilayer structure polymer (described in claim 1), JP 2005-139416 (in particular an acrylic resin film-like product (A) described in claim 1), JP 2008-106252 (in particular a rubber-containing polymer (I) and rubber-containing polymer (II) described in claim 1) or the like are preferred.

A kind of the rubber-containing acrylic basic graft copolymer may be used alone, or 2 or more kinds thereof may be used in combination.

A gel content ratio of the acrylic rubber-containing polymer (a-1) is preferably 40% by mass or more and 99% by mass or less, more preferably 50% by mass or more and 95% by mass or less, and still more preferably 55% by mass or more and 90% by mass or less.

When the gel content ratio of the acrylic rubber-containing polymer (a-1) is 40% by mass or more, mechanical strength of obtained molded articles can be further increased and handling becomes easier.

Especially when the resulting molded body is a film, after acrylic matted resin films are laminated directly or on resin sheets, it is easy to laminate the surface of various resin articles, woodworker products, or metal articles in three-dimensional shape and excellent in design.

When the gel content ratio of the acrylic rubber-containing polymer (a-1) is 99% by mass or less, fluidity and thermal stability at the time of molding do not become too low, and melt viscosity can be suppressed lower, so that residence in the molding machine can be reduced and thermal deterioration of resins can be suppressed, which is preferable.

When the resulting molded body is a film, failure such as an increase in a defect called a fish eye caused by heat degradation over time is not likely to occur, and it is possible to perform melt extrusion such as film molding over a long period of time.

Here, the gel content ratio of the acrylic rubber-containing polymer (a-1) can be calculated by the following formula.

$$G' = (m'/M') \times 100$$

In the formula, G' (%) represents the gel content ratio of the acrylic rubber-containing polymer (a-1), M' represents a mass of a predetermined amount of the acrylic rubber-containing polymer (a-1) (also referred to as a pre-extraction mass), and m' represents a mass of an acetone insoluble portion of the acrylic rubber-containing polymer (a-1) of the predetermined amount (also referred to as a post-extraction mass)

Since the gel content ratio of the acrylic resin composition (a) is preferably 80% by mass or less, when the gel content ratio of the acrylic rubber-containing polymer (a-1) described later is 80% by mass or more, the gel content ratio of the acrylic resin composition (a) can be adjusted by further containing a thermoplastic polymer (D).

The ratio of the content of the acrylic rubber-containing polymer (a-1) and the thermoplastic polymer (D) in the acrylic resin composition (a) is preferably from 100:0 to 40:60 (parts by mass), and more preferably from 95:5 to 70:30 (parts by mass).

<Polymer Containing a Hydroxyl Group (a-2)>

It is preferable that the acrylic resin composition (a) used in the present invention contains a polymer containing a hydroxyl group (a-2).

The polymer containing a hydroxyl group (a-2) is not particularly limited, and any polymer containing a hydroxyl group as a chemical structure may be used.

As the polymer containing a hydroxyl group (a-2) used in the present invention, a polymer containing a hydroxyl group contained in various conventionally known acrylic resin compositions is preferred.

Examples include Examples, a polymer containing a hydroxyl group having a glass transition temperature of 80 to 120° C. obtained by polymerizing a monomer composition comprising 1 to 30% by mass of a hydroxyalkyl (meth) acrylate having an alkyl group having 1 to 8 carbon atoms, 10 to 99% by mass of an alkyl methacrylate having an alkyl group having 1 to 13 carbon atoms, 0 to 10% by mass of an alkyl acylate having an alkyl group having 1 to 8 carbon atoms, and 0 to 50% by mass of at least one other vinyl monomer capable of copolymerization Examples of the hydroxyalkyl (meth) acrylate having an alkyl group having 1 to 8 carbon atoms used in the polymer containing a hydroxyl group (a-2) include 2-hydroxylethyl methacrylate, 2-hydroxypropyl methacrylate, 2,3-dihydroxypropyl methacrylate, 2-hydroxylethyl acrylate, and 4-hydroxybutyl acrylate.

Among them, 2-hydroxylethyl methacrylate is preferred.

The amount of this hydroxyalkyl (meth) acrylate to be used is preferably in the range of 1 to 30% by mass.

The matte effect becomes sufficient when this usage is over 1 mass %, and the water resistance of the film becomes good when it is under 30 mass %.

From the viewpoint of matte property and water whitening resistance, this amount used is more preferably 5 to 25% by mass, and still more preferably 10 to 20% by mass.

As the alkyl methacrylate having an alkyl group having 1 to 13 carbon atoms used in the polymer containing a hydroxyl group (a-2), for example, an alky methacrylate having a lower alkyl group having 1 to 4 carbon atoms such as methyl methacrylate, ethyl methacrylate, and butyl methacrylate is preferred, and among them, methyl methacrylate is optimum.

The amount of this alkyl methacrylate to be used is preferably 10 to 99% by mass, and more preferably 50 to 95% by mass from the viewpoint of water whitening resistance.

For the polymer containing a hydroxyl group (a-2), an alkyl acrylate having an alkyl group having 1 to 8 carbon atoms can be used.

Specifically, lower alkyl methacrylates such as methyl acrylate, ethyl acrylate, butyl acrylate, and 2-ethylhexyl acrylate are suitable.

Although the matte property and the water whitening resistance of the film become good even if the alkyl acrylate is not used, it is preferable to use an alkyl acrylate ester from the viewpoint of thermal decomposability.

In addition, in order to make the water whitening resistance of the film good, the alkyl acrylate is preferably used in a range of 10% by mass or less.

The amount of the alkyl acrylate to be used is more preferably 0 to 10% by mass, still more preferably 0.1 to 5% by mass, and still more preferably 0.1 to 2% by mass, from the viewpoint of thermal decomposition property and water whitening resistance.

As the polymer containing a hydroxyl group (a-2), at least one other vinyl monomer capable of copolymerization can be used.

Specific examples of the other vinyl monomer capable of copolymerization include aromatic vinyl compounds such as styrene, vinyl cyanide monomers such acrylonitrile, unsaturated dicarboxylic acid anhydrides such as maleic anhydride and itaconic anhydride, and N-phenylmaleimide and N-cyclohexylmaleimide.

In particular, when an unsaturated dicarboxylic acid anhydride such as maleic anhydride or itaconic anhydride, N-phenylmaleimide, or N-cyclohexylmaleimide is used, the glass transition temperature of the polymer containing a hydroxyl group (a-2) can be increased, so that the water whitening resistance of films is further improved.

The amount of other vinyl monomer capable of copolymerization to be used is preferably from 0 to 50% by weight.

The glass transition temperature of the polymer (a-2) containing a hydroxyl group is preferably 80 to 120° C.

From the viewpoint of water whitening resistance, the glass transition temperature is preferably 80° C. or more, more preferably more than 90° C.

In addition, from the viewpoint of dispersibility at the time of melt-kneading in the compound step, the glass transition temperature is preferably 120° C. or less, more preferably 110° C. or less.

The intrinsic viscosity of the polymer containing a hydroxyl group (a-2) is preferably adjusted to be in the range of 0.05 to 0.3 L/g in view of the appearance of the surface having matte expression property and matte property.

More preferably, it ranges from 0.06 to 0.15 L/g.

In addition, in the polymerization, a polymerization regulator such as mercaptan is preferably used for adjusting the molecular weight.

Examples of the mercaptan which can be used here include n-octylmercaptan, n-dodecylmercaptan, and t-dodecylmercaptan.

However, the present invention is not limited to these, and various conventionally known mercaptans can be used.

The method for producing the polymer containing a hydroxyl group (a-2) is not particularly limited, but suspension polymerization, emulsion polymerization, and the like are preferred.

As an initiator of suspension polymerization, various conventionally known ones can be used, and specific examples thereof include an organic peroxide and an azo compound.

As the suspension stabilizer, various conventionally known ones can be used, and specific examples thereof include an organic colloidal polymer substance, an inorganic colloidal polymer substance, an inorganic fine particle, and a combination of these and a surfactant.

Suspension polymerization is usually carried out by aqueous suspension of monomers together with a polymerization initiator in the presence of a suspension stabilizer.

Alternatively, a polymerization product soluble in a monomer may be dissolved in a monomer and used to perform suspension polymerization.

The amount of the polymer containing a hydroxyl group (a-2) to be added is preferably from 0.9 to 40 parts by mass, more preferably from 1.4 to 20 parts by mass, and still more preferably from 1.9 to 15 parts by mass, per 100 parts by mass of the resin constituting the acrylic resin composition (a) (the acrylic rubber-containing polymer (a-1), the thermoplastic polymer (D) optionally present, and the polymer containing a hydroxyl group (a-2)).

When the amount of the polymer containing a hydroxyl group (a-2) added is 0.9 parts by mass or more, a sufficient matte appearance is exhibited.

When the amount of the polymer containing a hydroxyl group (a-2) to be added is 40 parts by mass or less, fluidity and thermal stability at the time of molding do not become too low, and melt viscosity can be suppressed lower, and residence in the molding machine can be reduced and thermal deterioration of resins can be suppressed, which is preferable.

Failure such as an increase over time of the defect called fish eye caused by heat degradation is less likely to occur, and it is possible to perform melt extrusion such as film molding for a relatively long period of time <Phosphorus Based Antioxidant Having an Alkyl Group Having 8 or More Carbon Atoms (a-3)>

It is preferable that the acrylic resin composition (a) contains a phosphorus based antioxidant having an alkyl group having 8 or more carbon atoms (a-3).

The phosphorus-based antioxidant having an alkyl group having 8 or more carbon atoms (a-3) is not particularly limited, and any known phosphorus based antioxidant which is a phosphite ester compound having an alkyl group having 8 or more carbon atoms may be used.

By having an alkyl group having 8 or more carbon atoms, it is possible to improve the matte appearance of the surface having the matte property using the acrylic resin composition (a)

Examples include, 3,9-bis(octadecyloxy)-2,4,8,10-tetraoxa-3,9-diphosphaspiro[5.5]undecane [as a commercial product, for example, trade name by ADEKA Co., Ltd.: ADEKA STAB PEP-8], 2,2'-methylenebis(4,6-di-t-butylphenyl)2-ethylhexylphosphite [As a commercial product, for example, trade name by ADEKA Co., Ltd.: ADEKA STAB HP-10], trisnonylphenylphosphite [as a commercial product, for example, trade name by ADEKA Co., Ltd.: ADEKA STAB 1178], tetra-C12-15-alkyl (propane-2,2-diylbis(4,1-phenylene)bis(phosphite) [as a commercial product, for example, trade name by ADEKA Co., Ltd.: ADEKA STAB 1500], 2-ethylhexyldiphenylphosphite [as a commercial product, for example, trade name by ADEKA Co., Ltd.: ADEKA STAB C], triisodecylphosphite [as a commercial product, for example, trade name by ADEKA Co., Ltd.: ADEKA STAB 3010], trisnonylphenylphosphite [as a commercial product, for example, trade name by Johoku Chemical Co., Ltd.: JP-351], Tris (2-ethylhexyl) phosphite [as a commercial product, for example, trade name by Johoku Chemical Co., Ltd.: JP-308E], tridecylphosphite [as a commercial product, for example, trade name by Johoku Chemical Co., Ltd.: JP-310], trilaurylphosphite [as a commercial product, for example, trade name by Johoku Chemical Co., Ltd.: JP-312L], tris(tridecyl)phosphite [as a commercial product, for example, trade name by Johoku Chemical Co., Ltd.: JP-333E], trioleyl phosphite [as a commercial product, for example, trade name by Johoku Chemical Co., Ltd.: JP-318-0], diphenylmono (2-ethylhexyl) phosphite [as a commercial product, for example, trade name by Johoku Chemical Co., Ltd.: JPM-308], diphenylmonodecylphosphite [as a commercial product, for example, trade name by Johoku Chemical Co., Ltd.: JPM-311], diphenylmono (tridecylic) phosphite [as a commercial product, for example, trade name by Johoku Chemical Co., Ltd.: JPM-313], mixture of tetraphenyl (tetratridecyl) pentaerythritol tetraphosphite and bis (2-ethylhexyl) phthalate [as a commercial product, for example, trade name by Johoku Chemical Co., Ltd.: JPP-613M], tetra (C12-C15 alkyl)-4,4'-isopropyridene diphenyldiphosphite [as a commercial product, for example, trade name by Johoku Chemical Co., Ltd.: JA-8051, mixture of bis (tridecyl) pentaerythritol diphosphite and bis (nonylphenyl) pentaerythritol diphosphate [as a commercial product, for example, trade name by Johoku Chemical Co., Ltd.: JPP-88], bis (decyl) pentaerythritol diphosphate [as a commercial product, for example, trade name by Johoku Chemical Co., Ltd.: JPE-10], bis (tridecyl) pentaerythritol diphosphite [as a commercial product, for example, trade name by Johoku Chemical Co., Ltd.: JPE-13R], tristearyl phosphite [as a commercial product, for example, trade name by Johoku Chemical Co., Ltd.: JPE-318E], distearyl pentaerythritol diphosphate [as a commercial product, for example, trade name by Johoku Chemical Co., Ltd.: JPP-2000PT].

A kind of the phosphorus based antioxidant having an alkyl group having 8 or more carbon atoms (a-3) may be used alone, or 2 or more kinds thereof may be used in combination.

In addition, from the viewpoint of weather resistance of the film using the acrylic resin composition (a), it is preferable that the phosphorus-based antioxidant having an alkyl group having 8 or more carbon atoms (a-3) does not have an aromatic ring structure.

Phosphorus antioxidants (a-3) that do not possess aromatic ring structure may include trade names by ADEKA: ADEKASTAB PEP-8, ADEKASTAB 3010, trade names by Johoku Chemical Co., Ltd: JP-308E, JP-310, JP-312L, JP-333E, JP-318-0, JPE-10, JPE-13R, JP-318E, JPP-2000PT, etc. as described above.

In addition, from the viewpoint of the matte appearance of the surface having the matte property formed using the acrylic resin composition (a), at least one of the group of compounds represented by the following general formula (2) can be suitably used as the phosphorus-based antioxidant (a-3)

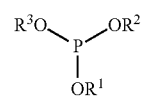

Formula (2)

wherein $R^1$, $R^2$ and $R^3$ each independently represents an alkyl group having 8 to 18 carbon atoms.

Examples of the alkyl group having 8 to 18 carbon atoms include octyl, nonyl, decyl, undecyl, dodecyl, tridecyl, tetradecyl, pentadecyl, hexadecyl, heptadecyl, and octadecyl.

Compounds represented by general formula (2) may include, for example, trade names by ADEKA: ADEKASTAB 3010, trade names by Johoku Chemical Co., Ltd: JP-308E, JP-310, JP-312L, JP-333E, JP-318-0, JP-318E etc. as described above.

A kind of the Compound represented by general formula (2) may be used alone, or 2 or more kinds thereof may be used in combination.

The compound represented by formula (2) is preferred because, when the number of carbon atoms of alkyl group represented by $R^1$, $R^2$ and $R^3$ is 8 or more, matte appearance of the surface having the matte property using the acrylic resin composition (a) can be improved, and when the number of carbon atoms is 18 or less, the solubility in the acrylic resin composition (a) is good.

Further, since $R^1$, $R^2$ and $R^3$ are alkyl groups, the influence on weather resistance is slight.

From the effect of suppressing matte appearance of the surface having matte property using the acrylic resin composition (a) and the volatilization at the time of film molding, it is further preferable that the acrylic resin composition is an alkyl group having 10 or more carbon atoms.

The amount of the phosphorus based antioxidant having an alkyl group having 8 or more carbon atoms (a-3) to be added is preferably 0.45 to 2.00% by mass, more preferably 0.50 to 1.50% by mass, and still more preferably 0.60 to 1.00% by mass, in the acrylic resin composition (a)

When the amount of the phosphorus based antioxidant having an alkyl group having 8 or more carbon atoms (a-3) to be added is 0.45% by mass or more, the matte appearance and the MFR-retaining ratio (M2/M1) of the acrylic resin composition (a) can be improved.

More specifically, in the compound step of producing the acrylic resin composition (a), the phosphorus-based antioxidant having an alkyl group having 8 or more carbon atoms (a-3) promotes the crosslinking reaction of the polymer containing a hydroxyl group (a-2), thereby improving the matte appearance of the surface having the matte property using the acrylic resin composition (a).

Further, when the crosslinking reaction of the polymer containing a hydroxyl group (a-2) is completed within the compound step, the MFR-retaining ratio (M2/M1) of the acrylic resin composition (a) becomes good, and the decrease in fluidity due to the progress of the crosslinking reaction after the next step is suppressed.

When the amount of the phosphorus based antioxidant having an alkyl group having 8 or more carbon atoms (a-3) to be added is 2.00% by mass or less, the matte appearance of the surface having the matte property using the acrylic resin composition (a) can be improved.

More specifically, in the compound step of producing the acrylic resin composition (a), since the viscosity of the molten resin becomes an appropriate range, the degree of dispersion of the polymer containing a hydroxyl group (a-2) becomes good, and the matte appearance of the surface having matte property using the acrylic resin composition (a) is improved.

<Thermoplastic Polymer (D)>

A polymer having no crosslinking point in the molecule in terms of molecular structure and having thermoplasticity is referred to herein as a "thermoplastic polymer (D)".

The acrylic resin composition (a) may contain this thermoplastic polymer (D)

The thermoplastic polymer (D) is not particularly limited, and any known thermoplastic polymer may be used.

However, the polymer containing a hydroxyl group (a-2) is excluded.

The thermoplastic polymer (D), for example, polyethylene based resin, polypropylene based resin, vinyl chloride basic resin, polystyrene based resin, AS based resin, PET based resin, acryl based resin, EVA based resin, vinylidene chloride based resin, polycarbonate based resin, polyamide based resin, polyacetal based resin, PBT based resin, fluorine based resin, thermoplastic elastomer and the like can be mentioned.

A kind of the thermoplastic polymer (D) may be used alone, or 2 or more kinds thereof may be used in combination.

As the thermoplastic polymer (D) which can be used in the present invention, it is preferable to be an acryl based polymer which requires quality requirements such as transparency and weather resistance.

In particular, an acrylic resin film requiring transparency, weather resistance, flexibility, processability, and the like includes a rubber containing polymer which is easily scorched, and thus can be particularly suitably used.

<Acrylic Polymer>

In the following description, "(meth) acrylic" means acrylic and/or methacrylic.

"(meth) alkyl acrylate" means alkyl acrylate and/or alkyl methacrylate.

In addition, "alkyl acrylate" and "alkyl methacrylate" mean an alkyl ester of acrylic acid and an alkyl ester of methacrylic acid, respectively.

The acrylic polymer which can be used as the thermoplastic polymer (D) in the present invention is not particularly limited except that alkyl (meth) acrylate is a main component.

As the acrylic polymer, an alkyl methacrylate-alkyl acrylate copolymer is preferred.

Specific examples of such an acrylic polymer include an acrylic polymer containing 50 to 100% by mass of an alkyl (meth) acrylate unit having an alkyl group having 1 to 4 carbon atoms and 0 to 50% by mass of at least one monomer unit of another vinyl monomer copolymerizable therewith, and having a reducing viscosity of the polymer of 0.01 L/g or less.

Note that this reducing viscosity is measured at 25° C. by dissolving 0.1 g of the polymer in 100 ml of chloroform.

The content of the alkyl (meth) acrylate unit is preferably 70 to 100% by mass.

In addition, it is preferable that the acrylic polymer has a glass transition temperature of 80 to 110° C.

Examples of the acrylic polymer satisfying these various physical properties include trade names by Mitsubishi Chemical Co., Ltd.: ACRY PET VH, ACRY PET MD, ACRY PET MF, and the like.

In addition, from the viewpoint of improving various physical properties and productivity of the acrylic matte resin film, as an acrylic based resin modifier, for example, trade names by Mitsubishi Chemical Co., Ltd. which are a high molecular weight acrylic polymer, may contain METABLEN P-531A, METABLEN P-530A, METABLEN P-551A, META-BLENE P-550A, METABLEN P-501A, METABLEN P-570A, METABLEN P-700, METABLEN P710, and a trade name by Mitsubishi Chemical Co., Ltd. which is an acrylic polymer external lubricant: METABLEN L-1000.

<Excipients>

The acrylic resin composition (a) may contain, if necessary, additives such as, for example, a stabilizer, a lubricant, a processing aid, a plasticizer, an impact aid, a foaming agent, a filler, an antibacterial agent, an antifungal agent, a mold release agent, an antistatic agent, a colorant, an ultraviolet absorber, a light stabilizer, an antioxidant, and the like.

In particular, when the acrylic matte resin film of the present invention is used as a protective layer of a base material, it is preferable that an ultraviolet absorber and/or a light stabilizer is contained in the acrylic resin composition (a) in order to impart weather resistance.

Further, it is preferable that an antioxidant is contained in order to suppress thermal decomposition of the ultraviolet absorber and/or the light stabilizer.

<Ultraviolet Absorber>

As the ultraviolet absorber, a known one can be used, and a copolymerization type one can also be used.

The molecular weight of the ultraviolet absorber used is preferably 300 or more, more preferably 400 or more.

When an ultraviolet absorber having a molecular weight of 300 or more is used, it is possible to prevent a mold stain or the like due to volatilization of an ultraviolet absorber when vacuum molding or pressure molding is performed in an injection molding die.

In addition, in general, the ultraviolet absorber having a higher molecular weight hardly causes long-term bleed-out after processing into a film state, and the ultraviolet absorbing performance lasts for a longer period of time than those having a lower molecular weight.

Further, when the molecular weight of the ultraviolet absorber is 300 or more, the amount of the ultraviolet absorber to be volatilized is small until the acrylic matte resin film is extruded from the T-die and cooled by the cooling roll.

Therefore, since the amount of ultraviolet absorber remained is sufficient, good performance is exhibited.

There is also a lesser problem that volatile ultraviolet absorbers recrystallize on chains that suspend T-die on the upper portion of T-die and on exhaust gas hoods that grow over time, which eventually fall onto the film and become defective in appearance.

The type of the ultraviolet absorber is not particularly limited, but a benzotriazole based having a molecular weight of 400 or more or a triazine based having a molecular weight of 400 or more can be particularly preferably used.

Examples of the former include trade names by ADEKA: ADEKASTAB LA-24, ADEKASTAB LA-31RG, etc.; trade names by BASF Japan Inc.: Tinuvin234, Tinuvin360, etc.; and examples of the latter include trade names by ADEKA: ADEKASTAB LA-46, ADEKASTAB LA-F70, etc.; trade names by BASF Japan Co., Ltd.: Tinuvin 1577ED, Tinuvin 1600, etc.

From the viewpoint of long-term thermal stability of the ultraviolet absorber itself, ADEKASTAB LA-31RG can be suitably used.

The amount of the ultraviolet absorber to be added is preferably in the range of 0.1 to 10 parts by mass per 100 parts by mass of the resin constituting the acrylic resin composition (a)

From the viewpoint of improving weather resistance, it is more preferably 0.5 parts by mass or more, and still more preferably 1 parts by mass or more.

On the other hand, from the viewpoint of preventing process fouling during film formation and from the viewpoint of transparency of the molded articles, it is more preferably 5 parts by mass or less, and still more preferably 3 parts by mass or less.

<Light Stabilizer>

As the light stabilizer, a known one can be used, and in particular, a radical scavenger such as a hindered amine based light stabilizer is preferred.

Examples include trade names by ADEKA include: ADEKASTAB LA-52, ADEKASTAB LA-57, ADEKASTAB LA-57G, ADEKASTAB LA-63P, ADEKASTAB LA-68, ADEKASTAB LA-72, ADEKASTAB LA-77Y, ADEKASTAB LA-81, ADEKASTAB LA-94G, etc.; trade names by BASF Japan Co., Ltd., Chimassorb2020FDL, Chimassorb944FDL, etc.

From the viewpoint of long-term thermal stability of the acrylic resin composition (a), Chimassorb2020FDL can be suitably used.

The amount of the light stabilizer to be added is preferably in the range of 0.1 to 2 parts by mass per 100 parts by mass of the resin constituting the acrylic resin composition (a).

From the viewpoint of weather resistance of the acrylic resin composition (a), 0.2 parts by mass or more is more preferable.

On the other hand, from the viewpoint of the MFR-retention ratio (M2/M1) of the acrylic resin composition (a), it is more preferably 1 parts by mass or less, and still more preferably 0.5 parts by mass or less.

When the amount of the light stabilizer to be added is 0.1 parts by mass or more, weather resistance of the acrylic matte resin film can be improved.

When the amount of the light stabilizer to be added is 2 parts by mass or less, the heat stability during molding is higher, and the increase of melting viscosity due to heat deterioration of the resin can be kept lower, so that the retention in the molding machine can be less, and the heat deterioration of the resin can be suppressed.

The resulting film is less likely to cause failure such as an increase over time of the defect called fish eye caused by heat degradation is less likely to and it is possible to perform melt extrusion such as film molding for a relatively long period of time <Antioxidant>

As the antioxidant, a known one can be used, and a phenol based antioxidant, particularly a hindered phenol based antioxidant, is preferred.

The phenol based antioxidant is not particularly limited, and any known phenol based antioxidant which is a compound containing a phenolic hydroxyl group may be used.

Examples of the phenol based antioxidant include, trade names by ADEKA Co., Ltd.: ADEKASTAB AO-20, ADEKASTAB AO-30, ADEKASTAB AO-40, ADEKASTAB AO-50, ADEKASTAB AO-60, ADEKASTAB AO-80, ADEKASTAB AO-330, etc.; trade names by BASF Japan Co., Ltd.; Irganox1010, Irganox1035, Irganox1076, Irganox1098, Irganox1135, Irganox1330, Irganox1425WL, Irganox1520L, Irganox245, Irganox259, Irganox3114, Irganox565, etc.

A kind of the phenolic antioxidant may be used alone, or 2 or more kinds thereof may be used in combination.

From the viewpoint of long-term thermostability of the acrylic resin composition (a), ADEKASTAB AO-60 or Irganox1010 can be suitably used.

The amount of the phenol based antioxidant to be added is preferably in the range of 0.2 to 10 parts by mass per 100 parts by mass of the resin constituting the acrylic resin composition (a).

From the viewpoint of thermal stability and weather resistance at the time of molding, it is more preferably 0.5 parts by mass or more, and still more preferably 0.8 parts by mass or more.

On the other hand, from the viewpoint of preventing process fouling during film formation and from the viewpoint of transparency of the molded articles, it is more preferably 5 parts by mass or less, and still more preferably 3 parts by mass or less.

<Acrylic Resin Composition which does not Express Matte Property (b)>

The acrylic resin composition which does not exhibit matte property (b) used in the present invention is a resin composition constituting a transparent acrylic resin layer when the acrylic matte resin film is a multilayer film.

The acrylic resin composition (b) is not particularly limited, and any composition may be used as long as it does not exhibit matte property and contains an acrylic resin as a main component.

The acrylic resin composition (b) includes an acrylic resin composition that does not contain a component exemplified as a matte component (matte agent) in the acrylic resin composition (a), and as a preferable example, an acrylic resin composition containing the acrylic rubber containing polymer (a-1) a phosphorus antioxidant having an alkyl group having 8 or more carbon atoms (a-3), a thermoplastic polymer (D), an ultraviolet absorber, a light stabilizer, an antioxidant, and an acrylic resin composition containing various additives, which can be used in the acrylic resin composition (a) described above, except for a polymer (a-2) containing a hydroxyl group which is a component (matte agent) exhibiting matte properties, can be suitably used.

<Laminate>

The acrylic matte resin film of the present invention, or a laminated film or sheet obtained by laminating an acrylic matte resin film of the present invention and yet another thermoplastic resin layer, is useful in applications in which a laminate is laminated to a base material.

In the case of a multilayer film, it is preferable to laminate the acrylic matte resin film on the base material so that a non-laminated surface of a transparent acrylic resin layer having excellent smoothness of a film surface of the acrylic matte resin film comes into contact with the base material.

The materials of the base material include, for example, resins, wood single plates, wood plots, particle boards, wood plates such as medium-density fibre plates (MDFs), water plates such as wood fibre plates, metals such as iron, aluminum, etc.

The above-mentioned resins include polyolefin based resins, such as polyethylene, polypropylene, polybutene, polymethylpentene, ethylene-propylene-butene copolymer, and olefin based thermoplastic elastomer; general purpose thermoplastic or thermosetting resin such as polystyrene resin, ABS resin, AS resin, acrylic resin, urethane based resin, unsaturated polyester resin, and epoxy resin; general purpose engineering resins, such as polyphenylene oxide and polystyrene basic resin, polycarbonate resin, polyacetal, polycarbonate modified polyphenylene ether, polyethylene terephthalate; super engineering resin such as polysulfone, polyphenylene sulfide, polyphenylene oxide, polyetherimide, polyimide, liquid crystal polyester, polyallylic heat-resistant resin etc.; reinforcing materials such as glass fiber or inorganic fillers (talc, calcium carbonate, silica, mica); composite resins or various modified resins to which modifiers such as a rubber component, etc., is added.

Of these, molten bondable resin is preferred, for example, ABS resin, AS resin, polystyrene resin, polycarbonate resin, vinyl chloride resin, acrylic resin, polyester resin or resins mainly composed of these are preferred.

In terms of adhesion. ABS resin, AS resin, polycarbonate resin, vinyl chloride resin or resin containing these as a main component is preferred, and in particular, ABS resin, polycarbonate resin or a resin containing these as a main component is more preferred.

Further, even a resin which does not thermally fuse, such as a polyolefin based resin, can be adhered at the time of molding by providing an adhesive layer.

As a method of producing the laminate, a known method such as thermal lamination can be used in the case of a laminate having a two-dimensional shape and in the case of a laminate in which a base material can be heat-fused.

For example, a base material that does not heat fuse such as wood single plates, wood plots, particulate boards, wood plates such as medium-density fibrous plates (MDFs), water plates such as wood fibrous plates, metals such as iron, aluminum, etc., may be affixed via the adhesive layer.

In the case of a three-dimensional laminated body, a known method such as an insert molding method or an in-mold molding method can be used.

The insert molding method is a method for forming a film or sheet with additional modifications such as printing into a three-dimensional shape by vacuum molding, etc. in advance, removing unnecessary film or sheet part, then transferring it into an injection molding mold, and obtaining a molded article (laminate) by integrating the resin as a base material by injection molding.

The in-mold molding method is a method for obtaining an article (volume) by placing a film or sheet with an additional modification such as printing in an injection mold, applying vacuum molding, and then integrating it by injecting a resin as a substrate in the same mold.

Since the acrylic matte resin film of the present invention, or a laminated film or sheet obtained by laminating the acrylic matte resin film of the present invention and yet another thermoplastic resin layer, is rich in elongation at high temperature, it is very advantageous when a three dimensional shape is imparted by vacuum molding.

As a resin for a base material used in injection molding, a resin whose shrinkage rate after injection molding is close to the shrinkage rate of the acrylic matte resin film of the present invention or the laminated film or sheet obtained by laminating the acrylic matte resin film of the present invention and yet another thermoplastic resin layer, is preferable.

When the shrinkage ratios of the two are close to each other, problems such as warpage of the laminate obtained by in-mold molding or insert molding or peeling of the film or sheet are less likely to occur.

EXAMPLES

Hereinafter, the present invention will be further explained by Examples and Comparative Examples.

In the following explanation, "parts" and "%" related to the amount ratio mean "parts by mass" and "% by mass", respectively, and the abbreviated symbol/abbreviated name mean the compound names shown in Table 1.

First, an evaluation method, an example of preparation of an acrylic rubber containing polymer (a-1), and a polymer containing a hydroxyl group (a-2) will be described.
<Evaluation Method>
(60° Surface Glossiness (Gs60°))

A gloss meter (produced by Konica Minolta Corporation, trade name: GM-268Plus) was used to measure the surface glossiness at 60° according to JIS Z8741.
(Arithmetic Mean Roughness (Ra) and Mean Length of Contour Curve Elements (Rsm))

Using a surface roughness measuring machine (manufactured by Tokyo Seimitsu Co., Ltd., trade name: SURFCOM 1400D), arithmetic mean roughness (Ra) and mean length of contour curve elements (Rsm) were measured under conditions of 4.0 mm measured length, 4.0 mm evaluated length, 0.8 mm cutoff wavelength, and 0.3 mm/s measured velocity according to JIS B0601-2001.

When measuring a long sample, such as a film, it can be measured either in the width direction (TD) or in the longitudinal direction (MD); however, the evaluation requires either the TD alone or the MD alone.

Incidentally, the arithmetic average roughness (Ra) extracts only the reference length in the direction of the mean line from the roughness curve, when the roughness curve is expressed in terms of $y=f(\chi)$ with the X axis in the direction of the mean line of this extracted portion and the Y axis in the direction of the vertical magnification, the value obtained by the following formula is expressed in micrometers (μm).

$$Ra = \frac{1}{\ell} \int_0^\ell |f(x)| dx$$

The mean length of contour curve elements (Rsm) is the mean of the length Xs of the contour curve elements at the reference length, and the values obtained by the following formula are expressed in micrometers (μm):

Also, Xsi is the length corresponding to one contour curve element.

$$Rsm = \frac{1}{m}\sum_{i=1}^{m} Xsi$$

(Gel Content Ratio of Acrylic Resin Composition (a))

An acetone solution in which an acrylic resin composition (a) with 0.5 g as the mass M before extraction is dissolved in 50 mL of acetone as is refluxed at 65° C. for 4 hours.

The obtained extract is centrifuged at 4° C. at a rotation speed of 14000 rpm for 30 minutes using a high-speed cooling centrifuge (manufactured by Hitachi Koki Co., Ltd., trade name: CR21G).

The solution is removed with decantation to give the remaining solid.

To this solid, reflux, centrifugation, and decantation are repeated again, and the mass of the acetone insoluble content obtained by drying the obtained solid at 50° C. for 24 hours is measured as the mass m after extraction.

The gel content ratio G (%) of the acrylic resin composition (a) is calculated from the mass M before extraction and the mass m after extraction by the following formula.

$G=(m/M)\times 100$

In the formula, G (%) represents a gel content ratio of the acrylic resin composition (a), M represents an acrylic resin composition (a) of a predetermined amount (also referred to as a pre-extraction mass), and m represents a mass of an acetone insoluble portion of the acrylic resin composition (a) of the predetermined amount (also referred to as a post-extraction mass)

(Gel Content Ratio of Acrylic Rubber-Containing Polymer (a-1))

An acetone solution in which an acrylic resin composition (a-1) with 0.5 g as the mass M' before extraction is dissolved in 50 mL of acetone as is refluxed at 65° C. for 4 hours.

The obtained extract is centrifuged at 4° C. at a rotation speed of 14000 rpm for 30 minutes using a high-speed cooling centrifuge (manufactured by Hitachi Koki Co., Ltd., trade name: CR21G).

The solution is removed with decantation to give the remaining solid.

To this solid, reflux, centrifugation, and decantation are repeated again, and the mass of the acetone insoluble content obtained by drying the obtained solid at 50° C. for 24 hours is measured as the mass m' after extraction.

The gel content ratio G'(%) of the acrylic resin composition (a-1) is calculated from the mass M' before extraction and the mass m after extraction by the following formula.

$G'=(m'/M')\times 100$

In the formula. G'(%) represents a gel content ratio of the acrylic resin composition (a-1), M' represents an acrylic resin composition (a-1) of a predetermined amount (also referred to as a pre-extraction mass), and m' represents a mass of an acetone insoluble portion of the acrylic resin composition (a-1) of the predetermined amount (also referred to as a post-extraction mass).

(Melt Flow Rate (M1))

Using a melt indexer (manufactured by Toyo Seiki Co., Ltd., trade name: S-111), the melt flow rate (M1) with a retention time of 4 minutes was measured for the sample volume 4 g under the condition of a temperature of 240° C. and a load of 49N according to JIS K7210 (method A).

The discharge amount per unit time was measured by setting the sample cutting time interval to 30 seconds to 120 seconds according to the melt flow rate (M1) of the sample, and the melt flow rate (M1) of g/10 min was calculated.

(Melt Flow Rate (M2))

Using a melt indexer (manufactured by Toyo Seiki Co., Ltd., trade name: S-111), the melt flow rate (M2) with a retention time of 20 minutes was measured for the sample volume 4 g under the condition of a temperature of 240° C. and a load of 49N according to JIS K7210 (method A).

The discharge amount per unit time was measured by setting the sample cutting time interval to 30 seconds to 120 seconds according to the melt flow rate (M2) of the sample, and the melt flow rate (M2) of g/10 min was calculated.

(MFR Retention Ratio (M2/M1))

MFR retention rate (M2/M1) was calculated as the ratio between melt flow rate (M2) with the retention time of 20 min described above and melt flow rate (M1) with the retention time of 4 min described above.

(Transparency (Total Light Transmittance, Haze))

Haze meter (Nippon Electronic Co., Ltd. trade name: Haze Meter NDH4000) was used, and the total light transmittance was measured according to JIS K7361-1, and the haze was measured according to AS K7136.

<Preparation Example 1> Production of Rubber-Containing Multistage Polymer (I)

After 10.8 parts of deionized water was charged into a container equipped with a stirrer, a monomer component (i-a-1) composed of 0.3 parts of MMA, 4.5 parts of n-BA, 0.2 parts of BDMA, 0.05 parts of AMA and 0.025 parts of CHP was charged and stirred and mixed at room temperature.

Then, while stirring, 1.3 parts of emulsifier S was charged into the above container, and stirring was continued for 20 minutes to prepare an "emulsified liquid 1"

Next, 156.0 parts of deionized water was charged into a polymerization vessel equipped with a reflux condenser, and the temperature was raised to 74° C.

In addition, a mixture was prepared by adding 0.20 part of sodium formaldehyde sulfoxylate, 0.0001 part of primary ferrous sulfate and 0.0003 part of EDTA to 4.5 parts of deionized water, and this mixture was put into the polymerization vessel.

Then, while stirring under a nitrogen atmosphere, the emulsified liquid 1 was added dropwise into the polymerization vessel over a period of 9 minutes, and then the reaction was continued for 15 minutes to complete the polymerization of a polymer (I-a1)

Subsequently, a monomer component (i-a-2) consisting of 9.6 parts of MMA, 14.4 parts of n-BA, 1 part of BDMA, 0.25 parts of AMA and 0.016 parts of CHP was added dropwise into the polymerization vessel for 90 minutes, and then the reaction was continued for 60 minutes to produce a polymer (I-a2).

Thus, a polymer (I-A) containing the polymer (I-a1) and the polymer (I-a2) was obtained.

Note that, when the respective monomer components for the polymer (I-a1) and for the polymer (I-a2) were separately polymerized under the same conditions as described above, the Tg of the polymer (I-a1) was −48° C., and the Tg of the polymer (I-a2) was −10° C.

Subsequently, a monomer component (i-c) consisting of 6 parts of MMA, 4 parts of MA, 0.075 parts of AMA and 0.013 parts of CHP was added dropwise into the polymerization vessel for 45 minutes, and then the reaction was continued for 60 minutes to produce a polymer (I-C)

Note that, when the monomer component for the polymer (I-C) was separately polymerized under the same conditions as described above, the Tg of the polymer (I-C) was 60° C.

Subsequently, the monomer component (i-b) consisting of 57 parts of MMA, 3 parts of MA, 0.075 parts of t-BHP and 0.248 parts of n-OM was added dropwise into the polymerization vessel for 140 minutes, and then the reaction was continued for 60 minutes to produce a polymer (I-B) to obtain a polymer latex of a rubber-containing multistage polymer (I).

A polymer latex of the obtained rubber-containing multistage polymer (I) was filtered using a vibration type filtration apparatus in which a mesh made of SUS (average opening: 54 μm) was attached to a filter medium, and then salted out in an aqueous solution containing 3.5 parts of calcium acetate, washed with water, and collected, and then dried to obtain a powdery rubber-containing multistage polymer (I).

Table 2 shows the list of each monomer component.

Note that the gel content ratio of the rubber-containing multistage polymer (I) was 70%

<Preparation Example 2> Production of Rubber-Containing Multistage Polymer (II)

After 10.8 parts of deionized water was charged into a container equipped with a stirrer, a monomer component (i-a-1) composed of 0.3 parts of MMA, 4.5 parts of n-BA, 0.2 parts of BDMA, 0.05 parts of AMA and 0.025 parts of CHP was charged and stirred and mixed at room temperature.

Then, while stirring, 1.1 parts of emulsifier S was charged into the above container, and stirring was continued for 20 minutes to prepare an "emulsified liquid 2"

Next, 155.8 parts of deionized water was charged into a polymerization vessel equipped with a reflux condenser, and the temperature was raised to 74° C.

In addition, a mixture was prepared by adding 0.20 part of sodium formaldehyde sulfoxylate, 0.0001 part of primary ferrous sulfate and 0.0003 part of EDTA to 4.5 parts of deionized water, and this mixture was put into the polymerization vessel.

Then, while stirring under a nitrogen atmosphere, the emulsified liquid 2 was added dropwise into the polymerization vessel over a period of 9 minutes, and then the reaction was continued for 15 minutes to complete the polymerization of a polymer (II-a1)

Subsequently, a monomer component (ii-a-2) consisting of 1.5 parts of MMA, 22.5 parts of n-BA, 1 part of BDMA, 0.25 parts of AMA and 0.016 parts of CHP was added dropwise into the polymerization vessel for 90 minutes, and then the reaction was continued for 60 minutes to produce a polymer (II-a2).

Thus, a polymer (II-A) containing the polymer (II-a1) and the polymer (II-a2) was obtained.

Subsequently, a monomer component (ii-c) consisting of 6 parts of MMA, 4 parts of n-BA, 0.075 parts of AMA and 0.013 parts of CHP was added dropwise into the polymerization vessel for 45 minutes, and then the reaction was continued for 60 minutes to produce a polymer (II-C)

Subsequently, the monomer component (ii-b) consisting of 55.2 parts of MMA, 4.8 parts of n-BA, 0.075 parts of t-BHP and 0.189 parts of n-OM was added dropwise into the polymerization vessel for 140 minutes, and then the reaction was continued for 30 minutes to produce a polymer (II-B) to obtain a polymer latex of a rubber-containing multistage polymer (II).

A polymer latex of the obtained rubber-containing multistage polymer (II) was filtered using a vibration type filtration apparatus in which a mesh made of SUS (average opening: 54 μm) was attached to a filter medium, and then salted out in an aqueous solution containing 3 parts of calcium acetate, washed with water, and collected, and then dried to obtain a powdery rubber-containing multistage polymer (II).

Table 2 shows the list of each monomer component.

Note that the gel content ratio of the rubber-containing multistage polymer (II) was 60%

<Preparation Example 3> Production of Rubber-Containing Multistage Polymer (III)

186.3 parts of deionized water was charged into a polymerization vessel equipped with a reflux condenser, and the temperature was raised to 79° C.

In addition, a mixture was prepared by adding 0.25 part of sodium formaldehyde sulfoxylate, 0.000025 part of primary ferrous sulfate and 0.000075 part of EDTA to 3.4 parts of deionized water, and this mixture was put into the polymerization vessel.

Subsequently, while stirring under a nitrogen atmosphere, 1/10 charging of a mixture of a monomer component (iii-a-1) consisting of 11.25 parts of MMA, 12.5 parts of n-BA, 1.24 parts of St, 0.74 part of BDMA, 0.09 parts of AMA and 0.044 parts of t-BHP, and 0.75 parts of emulsifier S was added dropwise into the polymerization vessel for 4 minutes, and then the reaction was continued for 15 minutes, then the remaining 9/10 charging of the mixture was dropped into the polymerization vessel for 108 minutes, followed by charging 0.125 parts of sodium formaldehyde sulfoxylate at the reaction time of 40 minutes, the reaction was continued for 55 minutes, and the polymerization of the polymer (III-a1) was completed.

Subsequently, a monomer component (iii-a-2) consisting of 30.94 parts of n-BA, 6.56 parts of St, 0.10 part of BDMA, 0.65 parts of AMA and 0.106 parts of CHP was added dropwise into the polymerization vessel for 180 minutes, followed by charging 0.125 parts of sodium formaldehyde sulfoxylate at the reaction time of 105 minutes, and then the reaction was continued for 120 minutes to produce a polymer (III-a2).

Thus, a polymer (III-A) containing the polymer (III-a1) and the polymer (III-a2) was obtained.

Subsequently, the monomer component (iii-b) consisting of 35.63 parts of MMA, 1.88 parts of MA, 0.064 parts of t-BHP and 0.103 parts of n-OM was added dropwise into the polymerization vessel for 120 minutes to produce a polymer (III-B) to obtain a polymer latex of a rubber-containing multistage polymer (III).

A polymer latex of the obtained rubber-containing multistage polymer (II) was filtered using a vibration type filtration apparatus in which a mesh made of SUS (average opening: 54 μm) was attached to a filter medium, and then salted out in an aqueous solution containing 5.0 parts of calcium acetate, washed with water, and collected, and then dried to obtain a powdery rubber-containing multistage polymer (II).

Table 2 shows the list of each monomer component.

Note that the gel content ratio of the rubber-containing multistage polymer (III) was 90%

<Preparation Example 4> Production of Polymer Containing a Hydroxyl Group (I)

A monomer mixture consisting of 319 parts of deionized water, 0.28 parts of sodium sulfate, 1.11 parts of sodium chloride, 79.0 parts of MMA, 1.0 parts of MA, 20.0 parts of 2-hydroxyethyl methacrylate, 0.22 parts of n-dodecylmercaptan and 0.53 parts of lauroyl peroxide was charged into a polymerization vessel with a reflux condenser, and the atmosphere in the polymerization vessel was sufficiently replaced with nitrogen gas.

Next, the monomer mixture was raised to 78° C. with stirring and reacted under a nitrogen atmosphere for 2 hours.

Subsequently, the liquid temperature in the polymerization vessel was raised to 90° C., and 0.030 parts of potassium persulfate was added after 45 minutes elapsed, and the mixture was further held for 90 minutes to obtain beads of a polymer.

The beads of the obtained polymer were subjected to sieving under a condition of 150 mesh (opening 100 μm), and the beads passed through the mesh were dehydrated and dried to obtain beads of a polymer containing a hydroxyl group (I)

The glass transition temperature of the obtained polymer containing a hydroxyl group (I) was 93° C., and the intrinsic viscosity was 0.076 L/g.

<Preparation Example 5> Production of Polymer Containing a Hydroxyl Group (II)

A monomer mixture consisting of 262 parts of deionized water, 12.3 parts of a 10% slurry of tertiary calcium phosphate, 60.0 parts of MMA, 10.0 parts of MA, 30.0 parts of 2-hydroxyethyl methacrylate, 0.25 parts of n-dodecylmercaptan and 0.52 parts of lauroyl peroxide was charged into a polymerization vessel with a reflux condenser, and the atmosphere in the polymerization vessel was sufficiently replaced with nitrogen gas.

Next, the monomer mixture was raised to 78° C. with stirring and reacted under a nitrogen atmosphere for 2 hours.

Subsequently, after raising the temperature of the liquid in the polymerization vessel to 85° C., 0.022 parts of potassium persulfate was added, and the mixture was further held for 90 minutes to obtain beads of a polymer.

The beads of the obtained polymer were subjected to sieving under a condition of 150 mesh (opening 100 μm), and the beads passed through the mesh were dehydrated and dried to obtain beads of a polymer containing a hydroxyl group (II).

The glass transition temperature of the obtained polymer containing a hydroxyl group (II) was 77° C., and the intrinsic viscosity was 0.069 L/g.

<Preparation Example 6> Production of an Acrylic Resin Composition (b) which does not Exhibit Matte Property Eighty parts of the rubber-containing multistage polymer (I) obtained in Preparation Example 1 which is an acrylic rubber-containing polymer (a-1), and 10 parts of rubber-containing multistage polymer (III) obtained in Preparation Example 3, 10 parts of alkyl methacrylate-alkyl acrylate copolymer (manufactured by Mitsubishi Chemical Co., Ltd.; trade name: ACRYPET MD) as the thermoplastic polymer (D), 1.4 parts of a benzotriazole based ultraviolet absorber (manufactured by BASF Japan Co., Ltd.; trade name: Tinuvin234), 0.3 parts of hindered amine based light stabilizer (manufactured by ADEKA Co., Ltd.: trade name: ADEKASTAB LA-57G), 0.1 part of hindered phenolic based antioxidant (manufactured by BASF Japan Co., Ltd.; trade name: Irganox1076) as the additive were added, then mixed using a Henshel Mixer, and were extruded into a strand shape using a twin-screw extruder (manufactured by Toshiba Mechanical Co., Ltd.; trade name: TEM-35B) under the conditions of a cylinder temperature of 180 to 240° C. and a die head temperature of 240° C. while removing impurities with a breaker mesh (manufactured by Nippon Seisen Co., Ltd., trade name: NF-12T, Nominal filtration diameter 40 μm) and cut into pellets after cooling through the aquarium.

The dice outlet resin temperature was 273° C. with a screw rotation of 150 rpm and an exhalation of 6.8 kg/h. The gel fraction of the obtained pellet was 66%

Example 1

As the acrylic resin composition (a) exhibiting matte property shown in Table 3, 50 parts of the rubber-containing multistage polymer (I) obtained in Preparation Example 1 which is an acrylic rubber-containing polymer (a-1) and 25 parts of the rubber-containing multistage polymer (II) obtained in Preparation Example 2, 23 parts of alkyl methacrylate-alkyl acrylate copolymer (manufactured by Mitsubishi Chemical Co., Ltd.; trade name: ACRYPET VH) as the thermoplastic polymer (D), 0.4 parts of an acrylic polymer external lubricant (manufactured by Mitsubishi Chemical Co., Ltd.; trade name: METABLEN-100), 2 parts of the polymer containing a hydroxyl group (I) obtained in Preparation Example 4 as a polymer containing a hydroxyl group (a-2), 0.7 parts of phosphorous ester compound (manufactured by Johoku Chemical Co., Ltd.: trade name: JP-333E) as the phosphorus based antioxidant having an alkyl group having 8 or more carbon atoms (a-3), 1.1 parts of a benzotriazole based ultraviolet absorber (manufactured by ADEKA Co., Ltd.; trade name: ADEKASTAB LA-31-RG), 0.2 parts of hindered amine based light stabilizer (manufactured by BASF Japan Co., Ltd.; trade name: Chimassorb2020FDL), 0.7 part of hindered phenolic based antioxidant (manufactured by ADEKA Co., Ltd.; trade name: ADEKASTAB AO-60) as the additive, were added, then mixed using a Henshel Mixer, and were extruded into a strand shape using a twin-screw extruder (manufactured by Toshiba Mechanical Co., Ltd.; trade name: TEM-35B) under the conditions of a cylinder temperature of 170 to 240° C. and a die head temperature of 240° C. while removing impurities with a 200 mesh screen mesh and cut into pellets after cooling through the aquarium.

The dice outlet resin temperature was 288° C. with a screw rotation of 280 rpm and an exhalation of 18.5 kg/h. The gel fraction of the obtained pellet was 46%, the melt flow rate (M1) was 3.6 g/10 min, the melt flow rate (M2) was 3.4 g/10 min, and the MFR retention ratio (M2/M1) was 1.0, and the evaluation results are shown in Table 3

The resulting pellets were dehumidified and dried one day and night at 85° C.

Using a 40 mmφ non-vented screw type extruder (L/D=26) provided with a 200 mesh screen mesh with a 300 mm wide T-die attached, under the conditions of a cylinder temperature of 200 to 240° C. and a die head temperature of 245° C., an acrylic matte resin film was formed.

The arithmetic mean roughness (Ra) [μm] of the obtained acrylic matte resin films was 0.07 for MD and 0.07 for TD, and the 60 surface glossiness (Gs6°) was 48.2% for MD and 52.1% for TD.

Examples 2-11, Comparative Examples 1-4

The same procedure as in Example 1 was carried out except that the acrylic resin composition (a) was set to the composition shown in Table 3

Evaluation results of the obtained pellets and the acrylic matte resin film are shown in Table 3

Example 12

A pellet of the acrylic resin composition (a) obtained in Example 10 as a resin composition constituting a matte acrylic resin layer consisting of a matte acrylic resin film and the acrylic resin composition (b) obtained in Preparation Example 6 as a resin composition constituting a transparent acrylic resin layer were dehumidified and dried one day and night at 85° C.

Using a 40 mmφ non-vented screw type extruder (L/D=26) provided with a 200 mesh screen mesh, under the conditions of a cylinder temperature of 200 to 240° C., the acrylic resin composition (a) was plasticized.

On the other hand, using a 40 mmφ non-vented screw type extruder (L/D=26) provided with a 500 mesh screen mesh, under the conditions of a cylinder temperature of 220 to 240° C., the acrylic resin composition (b) was plasticized.

Next, using a multi-manifold T-die for two kinds of two layers of 500 mm width set at 245° C., an acrylic matte resin film having a thickness of 75 μm was produced by contacting the transparent acrylic resin layer side with the specular cooling roll.

When the cross section of the acrylic matte resin film was observed, the thickness of the matte acrylic resin layer made of the matte acrylic resin film was 7.5 μm, and the thickness of the transparent acrylic resin layer was 67.5 μm.

In addition, the arithmetic mean roughness (Ra) of the side of the matte acrylic resin layer consisting of a matted acrylic resin film that is not laminated with a transparent acrylic resin was 0.32 for MD and 0.31 for TD and the 60° surface glossiness (Gs60°) was 12.6% for MD and 12.9% for TD.

The 60° surface glossiness (Gs60°) of the side of the transparent acrylic resin layer that is not laminated with the matte acrylic resin layer consisting of matted acrylic resin film was 145% for MD and 146% for TD.

TABLE 1

| Abbreviations | Compound name |
|---|---|
| MMA | Methyl methacrylate |
| n-BA | N-butyl acrylate |
| St | Styrene |
| MA | Methyl acrylate |
| AMA | Allylmethacrylate |
| BDMA | 1,3-butylene glycol dimethacrylate |
| t-BHP | t-butyl hydroperoxide |
| CHP | Cumene hydroperoxide |
| n-OM | n-Octylmercaptan |
| Emulsifying agent S | Sodium polyoxyethylene alkyl ether phosphate Brand name: Phosphanol RS-610NA, Toho Chemical Co., Ltd. |
| EDTA | Disodium ethylenediaminetetraacetate |

TABLE 2

| Monomeric component | Rubber-containing multistage polymer (I) | | Monomeric component | Rubber-containing multistage polymer (II) | | Monomeric component | Rubber-containing multistage polymer (III) | |
|---|---|---|---|---|---|---|---|---|
| | Compound name | Part by mass | | Compound name | Part by mass | | Compound name | Part by mass |
| Monomeric component (i-a-1) | MMA | 0.3 | Monomeric component (ii-a-1) | MMA | 0.3 | Monomeric component (iii-a-1) | MMA | 11.25 |
| | n-BA | 4.5 | | n-BA | 4.5 | | n-BA | 12.5 |
| | | | | | | | St | 1.25 |
| | BDMA | 0.2 | | BDMA | 0.2 | | BDMA | 0.74 |
| | AMA | 0.05 | | AMA | 0.05 | | AMA | 0.09 |
| | CHP | 0.025 | | CHP | 0.025 | | t-BHP | 0.044 |
| Monomeric component (i-a-2) | MMA | 9.6 | Monomeric component (ii-a-2) | MMA | 1.5 | Monomeric component (iii-a-2) | n-BA | 30.94 |
| | n-BA | 14.4 | | n-BA | 22.5 | | St | 6.56 |
| | BDMA | 1 | | BDMA | 1 | | BDMA | 0.10 |
| | AMA | 0.25 | | AMA | 0.25 | | AMA | 0.65 |
| | CHP | 0.016 | | CHP | 0.016 | | CHP | 0.106 |
| Monomeric component (i-c) | MMA | 6 | Monomeric component (ii-c) | MMA | 6 | | | |
| | MA | 4 | | n-BA | 4 | | | |
| | AMA | 0.075 | | AMA | 0.075 | | | |
| | CHP | 0.013 | | CHP | 0.013 | | | |
| Monomeric component (i-b) | MMA | 57 | Monomeric component (ii-b) | MMA | 55.2 | Monomeric component (iii-b) | MMA | 35.63 |
| | MA | 3 | | n-BA | 4.8 | | MA | 1.88 |
| | t-BHP | 0.075 | | t-BHP | 0.075 | | t-BHP | 0.064 |
| | n-OM | 0.248 | | n-OM | 0.189 | | n-OM | 0.103 |

TABLE 3

| | | | Ex. 1 | Ex. 2 | Ex. 3 | Ex. 4 | Ex. 5 | Ex. 6 | Ex. 7 |
|---|---|---|---|---|---|---|---|---|---|
| Acrylic matte resin composition (a) (parts by mass) | Acrylic rubber-containing polymer (a-1) | Rubber-containing polymer (I) | 50 | 50 | 50 | 50 | 50 | 50 | 50 |
| | | Rubber-containing polymer (II) | 25 | 25 | 25 | 25 | 25 | 25 | 25 |
| | Thermoplastic polymer (D) | Acripet VH | 23 | 21 | 19 | 17 | 15 | 13 | 21 |
| | | Metabolene L-1000 | 0.4 | 0.4 | 0.4 | 0.4 | 0.4 | 0.4 | 0.4 |
| | | Metabolene P-551A | — | — | — | — | — | — | — |
| | Polymer containing hydroxyl groups (a-2) | Hydroxyl group-containing polymer (I) | 2 | 4 | 6 | 8 | 10 | 12 | — |
| | | Hydroxyl group-containing polymer (II) | — | — | — | — | — | — | 4 |

TABLE 3-continued

|  |  |  | Ex. 1 | Ex. 2 | Ex. 3 | Ex. 4 | Ex. 5 | Ex. 6 | Ex. 7 |
|---|---|---|---|---|---|---|---|---|---|
|  | Phosphorus antioxidant (a-3) with akyl groups of more than eight carrions | JP-333E | 0.7 | 0.7 | 0.7 | 0.7 | 0.7 | 0.7 | 0.7 |
|  | UV absorber | Adekastab LA-31RG | 1.1 | 1.1 | 1.1 | 1.1 | 1.1 | 1.1 | 1.1 |
|  |  | Tinuvin 234 | — | — | — | — | — | — | — |
|  | Light stabilizer | Chimassorb 2020 FDL | 0.2 | 0.2 | 0.2 | 0.2 | 0.2 | 0.2 | 0.2 |
|  |  | Adekastab LA-57G | — | — | — | — | — | — | — |
|  | Phenolic antioxidant | Adekastab AO-60 | 0.7 | 0.7 | 0.7 | 0.7 | 0.7 | 0.7 | 0.7 |
| Phosphoric acid | antioxidants (Mass %) |  | 0.68 | 0.68 | 0.68 | 0.68 | 0.58 | 0.68 | 0.88 |
| Pellet properties | Gel content (%) |  | 48 | 48 | 50 | 52 | 54 | 56 | 48 |
|  | Melt flow rate (M1) [g/10 min] |  | 3.6 | 2.6 | 2.2 | 1.7 | 1.6 | 1.4 | 3.6 |
|  | Melt flow rate (M2) [g/10 min] |  | 3.4 | 2.4 | 2.1 | 1.5 | 1.6 | 1.3 | 3.3 |
|  | MFR-retention rate (M2/M1) [—] |  | 1.0 | 0.9 | 0.9 | 0.9 | 0.8 | 0.8 | 0.9 |
| Film properties | Arithmetical mean deviation (Ra)[µm] | MD | 0.07 | 0.16 | 0.2 | 0.22 | 0.32 | 0.34 | 0.12 |
|  |  | TD | 0.07 | 0.15 | 0.2 | 0.25 | 0.33 | 0.33 | 0.11 |
|  | Mean length of contour curve elements (Rsm) [µm] | MD | 35.96 | 46.20 | 54.88 | 61.66 | 74.94 | 63.47 | 39.88 |
|  |  | TD | 41.57 | 56.06 | 46.99 | 53.66 | 51.94 | 57.70 | 48.25 |
|  | 60° surface glossiness | MD | 48.2 | 22.3 | 15.7 | 12.3 | 10.7 | 10 | 32.4 |
|  |  | TD | 52.1 | 23.5 | 18.4 | 13 | 11.3 | 10.7 | 34.5 |
|  | $2.2 \times NGs60°^{(-0.37)}$ | MD | 0.05 | 0.11 | 0.15 | 0.19 | 0.22 | 0.24 | 0.08 |
|  |  | TD | 0.05 | 0.1 | 0.15 | 0.18 | 0.21 | 0.22 | 0.07 |
|  | $4.4 \times NGs80°^{(-0.37)}$ | MD | 0.10 | 0.22 | 0.30 | 0.39 | 0.44 | 0.47 | 0.15 |
|  |  | TD | 0.10 | 0.21 | 0.29 | 0.37 | 0.42 | 0.44 | 0.14 |
|  | Transparency | The total light transmittance | 91.9 | 90.8 | 91.7 | 92.5 | 93.6 | 94.1 | 91.2 |
|  |  | Haze | 20.2 | 41.6 | 55.7 | 65.1 | 72.5 | 75.2 | 30.9 |

TABLE 4

|  |  |  | Ex. 8 | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|---|---|
| Acrylic matte resin composition (a) (parts by mass) | Acrylic rubber-containing polymer (a-1) | Rubber-containing polymer (I) | 50 | 50 | 50 | 50 | 50 | 50 | 50 | 50 |
|  |  | Rubber-containing polymer (II) | 25 | 25 | 25 | 25 | 25 | 25 | 25 | 25 |
|  | Thermoplastic polymer (D) | Acripet VH | 19 | 17 | 15 | 15 | 25 | 17 | 15 | 15 |
|  |  | Metabolene L-1000 | 0.4 | 0.4 | 0.4 | 0.4 | 0.4 | 0.8 | 0.8 | 0.4 |
|  |  | Metabolene P-551A | — | — | 3 | 3 | — | 3 | 3 | — |
|  | Polymer containing hydroxyl groups (a-2) | Hydroxyl group-containing polymer (I) | — | — | — | 10 | — | — | — | — |
|  |  | Hydroxyl group-containing polymer (II) | 6 | 8 | 10 | — | — | 8 | 10 | 10 |
|  | Phosphorus antioxidant (a-3) with akyl groups of more than eight carrions | JP-333E | 0.7 | 0.7 | 0.7 | 0.7 | 0.7 | 0.3 | 0.3 | 0.3 |
|  | UV absorber | Adekastab LA-31RG | 1.1 | 1.1 | 1.1 | 1.1 | 1.1 | — | — | 1.1 |
|  |  | Tinuvin 234 | — | — | — | — | — | 1.4 | 1.4 | — |
|  | Light stabilizer | Chimassorb 2020 FDL | 0.2 | 0.2 | 0.2 | 0.2 | 0.2 | — | — | 0.2 |
|  |  | Adekastab LA-57G | — | — | — | — | — | 0.3 | 0.3 | — |
|  | Phenolic antioxidant | Adekastab AO-60 | 0.7 | 0.7 | 0.7 | 0.7 | 0.7 | 0.1 | 0.1 | 0.7 |
|  | Phosphoric acid antioxidants (Mass %) |  | 0.88 | 0.68 | 0.68 | 0.68 | 0.88 | 0.28 | 0.28 | 0.28 |
| Pollet properties | Gel content (%) |  | 50 | 52 | 52 | 52 | 44 | 51 | 53 | 52 |
|  | Melt flow rate (M1) [g/10 min] |  | 3 | 2.5 | 1.4 | 1.6 | 5.2 | 1.6 | 1.5 | 1.6 |
|  | Melt flow rate (M2) [g/10 min] |  | 2.8 | 2.3 | 1.2 | 1.3 | 5.5 | 0.9 | 0.7 | 0.8 |
|  | MFR-retention rate (M2/M1) [—] |  | 0.9 | 1 | 0.9 | 0.9 | 1.1 | 0.6 | 0.4 | 0.5 |
| Film properties | Arithmetical mean deviation (Ra)[µm] | MD | 0.17 | 0.27 | 0.32 | 0.36 | 0.04 | 0.33 | 0.56 | 0.49 |
|  |  | TD | 0.17 | 0.25 | 0.31 | 0.34 | 0.03 | 0.43 | 0.53 | 0.45 |
|  | Mean length of contour curve elements (Rsm) [µm] | MD | 46.64 | 60.40 | 64.91 | 68.32 | — | 103.46 | 97.38 | 134.50 |
|  |  | TD | 44.24 | 47.13 | 57.45 | 65.41 | — | 97.35 | 92.45 | 100.10 |
|  | 60° surface glossiness | MD | 19.9 | 14.0 | 12.5 | 11.7 | 145.0 | 14.7 | 10.2 | 10.4 |
|  |  | TD | 20.1 | 14.1 | 12.9 | 12.6 | 143.0 | 14.9 | 12.0 | 12.3 |
|  | $2.2 \times NGs60°^{(-0.37)}$ | MD | 0.12 | 0.17 | 0.19 | 0.20 | 0.02 | 0.16 | 0.23 | 0.23 |
|  |  | TD | 0.12 | 0.17 | 0.18 | 0.19 | 0.02 | 0.16 | 0.20 | 0.19 |
|  | $4.4 \times NGs80°^{(-0.37)}$ | MD | 0.24 | 0.34 | 0.38 | 0.40 | 0.04 | 0.32 | 0.46 | 0.45 |
|  |  | TD | 0.24 | 0.34 | 0.37 | 0.38 | 0.04 | 0.32 | 0.40 | 0.35 |
|  | Transparency | The total light transmittance | 91.3 | 92.3 | 92.8 | 82.5 | 92.5 | 91.5 | 92.8 | 93.5 |
|  |  | Haze | 49.3 | 63.1 | 71.3 | 72.6 | 0.6 | 58.1 | 88.4 | 71.5 |

Based on the above examples and comparative examples, the following was revealed.

In relation to the numerical partial NGs60 of 60° surface glossiness (Gs60°) of the film surface having matte property and arithmetic mean roughness (Ra), when Ra was $2.2 \times NGs60°^{(-0.97)}$ or more and $4.4 \times NGs60°^{(-0.97)}$ or less, the glare of the matte appearance is extremely low, and the designability and decorativeness such as luxury and depth are good (Examples 1-12).

On the other hand, in particular, in relation to 60° surface glossiness (Gs60°) and arithmetic mean roughness (Ra) of the film surface, when Ra exceeded $4.4 \times NGs60°^{(-0.97)}$, the glare of the matte appearance is extremely high, and the designability and decorativeness such as luxury and depth are poor.

In addition, when the amount of the phosphorus based antioxidant having an alkyl group having 8 or more carbon atoms (a-3) to be added was less than 0.45% by mass, the MFR retention ratio (M2/M1) was poor (Comparative Examples 2 to 4)

Moreover, in the relationship between arithmetic average roughness (Ra) of film surface and mean length of contour curve elements (Rsm), when the arithmetic mean roughness (Ra) of the film surface having matte property was 0.05 or more and 0.47 or less and the mean length of contour curve elements (Rsm) was 30.00 or more and 80.00 or less, the glare of the matte appearance is extremely low, and the designability and decorativeness such as luxury and depth are good (Examples 1-12).

On the other hand, in particular, when the arithmetic mean roughness (Ra) of the film surface having surface glossiness was less than 0.05 or more than 0.47, and the mean length of contour curve elements (Rsm) was less than 30.00 or more than 80.00, the glare of the matte appearance is extremely high, and the designability and decorativeness such as luxury and depth are poor.

In addition, when the amount of the phosphorus based antioxidant having an alkyl group having 8 or more carbon atoms (a-3) to be added was less than 0.45% by mass, the MFR retention ratio (M2/M1) was poor (Comparative Examples 2 to 4).

INDUSTRIAL APPLICABILITY

According to the present invention, an acrylic matte resin film with good matte appearance, high thermal stability during molding, stable production, in addition, excellent appearance design, high mechanical strength, easy handling, and applicability for various applications can be provided.

The invention claimed is:

1. An acrylic matte resin film which has a surface having a 60° surface glossiness (Gs60°) of less than 100% on at least one of the films, wherein an arithmetic mean roughness (Ra) of the surface having the surface glossiness satisfies the following formula (1) and wherein the surface satisfying the following formula (1), comprises an acrylic resin composition (a) has a gel content of 40% by mass or more:

$$2.2 \times NGs60°^{(-0.97)} \leq Ra \leq 4.4 \times NGs60°^{(-0.97)} \quad \text{Formula (1)}$$

wherein NGs indicates a value obtained by excluding % from Gs60°, which is less than 100%.

2. An acrylic matte resin film which has a surface having a 60° surface glossiness (Gs60°) of less than 100% on at least one of the films, wherein an arithmetic mean roughness (Ra) of the surface having the surface glossiness is 0.05 or more and 0.47 or less, and a mean length of contour curve elements (Rsm) is 30.00 or more and 80.00 or less, and wherein the surface having the surface glossiness comprises an acrylic resin composition (a) has a gel content of 40% by mass or more.

3. An acrylic matte resin film having a laminated structure of a matte acrylic resin layer comprising the acrylic matte resin film according to claim 1 and a transparent acrylic resin layer.

4. The acrylic matte resin film of claim 1 wherein the acrylic resin composition (a) has a MFR retention rate (M2/M1) of 0.7 to 1.3, which is a ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

5. The acrylic matte resin film according to claim 4, wherein the acrylic resin composition (a) contains an acrylic rubber-containing polymer (a-1), a polymer containing a hydroxyl group (a-2), and a phosphorus based antioxidant having an alkyl group having 8 or more carbon atoms (a-3).

6. The acrylic matte resin film according to claim 5, wherein the phosphorus-based antioxidant (a-3) is at least one selected from the group of compounds represented by the following general formula (2), and the content of the phosphorus-based antioxidant (a-3) in the acrylic resin composition (a) is 0.45 to 2.00% by mass:

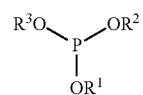

Formula (2)

wherein $R^1$, $R^2$ and $R^3$ each independently represents an alkyl group having 8 to 18 carbon atoms.

7. An acrylic matte resin film having a laminated structure of a matte acrylic resin layer comprising the acrylic matte resin film according to claim 2 and a transparent acrylic resin layer.

8. The acrylic matte resin film of claim 2 wherein the acrylic resin composition (a) has a MFR retention rate (M2/M1) of 0.7 to 1.3, which is a ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

9. The acrylic matte resin film of claim 3 wherein the acrylic resin composition (a) has a MFR retention rate (M2/M1) of 0.7 to 1.3, which is a ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

10. The acrylic matte resin film of claim 7 wherein the acrylic resin composition (a) has a MFR retention rate (M2/M1) of 0.7 to 1.3, which is a ratio between a melt flow rate (M1) with the retention time of 4 min measured under conditions of temperature 240° C. and load 49N according to JIS K7210, and a melt flow rate (M2) with the retention time of 20 min measured under conditions of temperature 240° C. and load 49N according to JIS K7210.

11. The acrylic matte resin film according to claim 8, wherein the acrylic resin composition (a) contains an acrylic rubber-containing polymer (a-1), a polymer containing a hydroxyl group (a-2), and a phosphorus based antioxidant having an alkyl group having 8 or more carbon atoms (a-3).

12. The acrylic matte resin film according to claim 9, wherein the acrylic resin composition (a) contains an acrylic rubber-containing polymer (a-1), a polymer containing a hydroxyl group (a-2), and a phosphorus based antioxidant having an alkyl group having 8 or more carbon atoms (a-3).

13. The acrylic matte resin film according to claim 10, wherein the acrylic resin composition (a) contains an acrylic rubber-containing polymer (a-1), a polymer containing a hydroxyl group (a-2), and a phosphorus based antioxidant having an alkyl group having 8 or more carbon atoms (a-3).

* * * * *